US007691477B2

(12) United States Patent
Heuer et al.

(10) Patent No.: US 7,691,477 B2
(45) Date of Patent: Apr. 6, 2010

(54) POLYFORMALS AS A COEXTRUSION PROTECTIVE LAYER ON POLYCARBONATE

(75) Inventors: Helmut-Werner Heuer, Krefeld (DE); Rolf Wehrmann, Krefeld (DE); Sylvia Braun, Duisburg (DE); Claus Rüdiger, Krefeld (DE); Marco Roelofs, Krefeld (DE); Wolfgang Nising, Sankt Augustin (DE); Siegfried Anders, Köln (DE); Jürgen Röhner, Köln (DE); Rüdiger Gorny, Moon Township, PA (US); Ralf Hufen, Duisburg (DE)

(73) Assignee: Bayer MaterialScience AG, Leverkusen (DE)

( * ) Notice: Subject to any disclaimer, the term of this patent is extended or adjusted under 35 U.S.C. 154(b) by 317 days.

(21) Appl. No.: 11/245,406

(22) Filed: Oct. 6, 2005

(65) Prior Publication Data

US 2006/0251900 A1 Nov. 9, 2006

Related U.S. Application Data

(63) Continuation-in-part of application No. 10/894,995, filed on Jul. 20, 2004, now abandoned.

(30) Foreign Application Priority Data

Jul. 25, 2003 (DE) ................................. 103 33 927
Jan. 16, 2004 (DE) ....................... 10 2004 002 523

(51) Int. Cl.
 *B28B 3/20* (2006.01)
 *B32B 27/08* (2006.01)
 *B32B 27/28* (2006.01)
 *B32B 27/30* (2006.01)
 *B32B 27/36* (2006.01)
 *B29D 22/00* (2006.01)
 *C08G 65/38* (2006.01)
 *C08G 75/00* (2006.01)

(52) U.S. Cl. ................ 428/412; 264/176.1; 428/35.7; 428/480; 428/500; 528/174; 528/196; 528/198; 528/204; 528/219

(58) Field of Classification Search ............. 428/412, 428/480, 65.7, 500; 264/176.1; 528/174, 528/196, 198, 204, 219
See application file for complete search history.

(56) References Cited

U.S. PATENT DOCUMENTS

| | | | | |
|---|---|---|---|---|
| 1,924,708 A | | 8/1933 | Christiansen et al. ............ 99/11 |
| 3,069,386 A | * | 12/1962 | Barclay, Jr. .................. 528/174 |
| 3,134,682 A | | 5/1964 | Vogel et al. ..................... 99/181 |
| 3,547,294 A | | 12/1970 | Williams ......................... 215/1 |
| 4,139,517 A | * | 2/1979 | Zaganiacz .................... 524/611 |
| 4,163,833 A | | 8/1979 | Johnson ........................ 528/205 |
| 4,210,731 A | * | 7/1980 | Relles et al. .................. 525/469 |
| 4,216,305 A | * | 8/1980 | Carnahan ..................... 528/196 |
| 4,237,259 A | * | 12/1980 | Keeley ........................ 528/204 |
| 4,260,733 A | * | 4/1981 | Loucks et al. ................ 528/219 |
| 4,334,050 A | * | 6/1982 | White .......................... 525/390 |
| 4,340,696 A | * | 7/1982 | White et al. .................. 525/390 |
| 4,345,050 A | * | 8/1982 | Loucks ........................ 525/390 |
| 4,345,051 A | * | 8/1982 | Loucks ........................ 525/390 |
| 4,356,290 A | * | 10/1982 | White .......................... 525/397 |
| 4,374,974 A | * | 2/1983 | Hay ............................. 528/219 |
| 4,395,537 A | * | 7/1983 | Yonezawa et al. ............. 28/219 |
| 4,513,037 A | * | 4/1985 | Collins ...................... 215/12.2 |
| 4,801,679 A | * | 1/1989 | Shigematsu et al. .......... 528/219 |
| 4,833,771 A | * | 5/1989 | Dunwoodie .................. 220/1.5 |
| 5,001,177 A | | 3/1991 | Winfried et al. ............... 524/86 |
| 5,002,199 A | * | 3/1991 | Frahm ......................... 220/670 |
| 5,104,964 A | | 4/1992 | Kuze et al. ................... 528/204 |
| 5,108,835 A | | 4/1992 | Hähnsen et al. .............. 428/334 |
| 5,283,314 A | | 2/1994 | Kuze et al. ................... 528/204 |
| 5,288,778 A | | 2/1994 | Schmitter et al. ............ 524/100 |
| 5,441,808 A | * | 8/1995 | Anderson et al. ............ 428/349 |

(Continued)

FOREIGN PATENT DOCUMENTS

DE 2738962 A * 5/1978

(Continued)

OTHER PUBLICATIONS

Brydson, J. (1999). Plastics Materials (7th Edition). (pp. 575). Elsevier. Online version available at: http://www.knovel.com/knovel2/Toc.jsp?BookID=440&VerticalID=0.*

(Continued)

*Primary Examiner*—Callie E Shosho
*Assistant Examiner*—John Freeman
(74) *Attorney, Agent, or Firm*—Connolly Bove Lodge & Hutz LLP

(57) ABSTRACT

A multi-layer article is disclosed. The article contains a base layer that contains at least one thermoplastic resin and a second layer containing a thermoplastic (co)polyformal superimposed over the base layer. The (co)polyformal conforms to formulae (1a) or (1b),

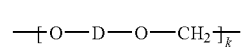

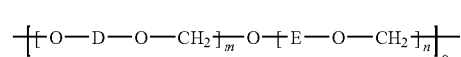

in which O-D-O and O-E-O independently denote a diphenolate group, -D- and -E- independently denote an aromatic group having 6 to 40 carbon atoms, k is a whole number from 1 to 1500, o stands for numbers from 1 to 1500, and m is z/o and n is (o-z)/o wherein z is 0 to o.

13 Claims, No Drawings

U.S. PATENT DOCUMENTS

| | | |
|---|---|---|
| 6,613,869 B1 | 9/2003 | Horn et al. ............... 528/198 |
| 6,682,794 B1 | 1/2004 | Horn et al. ............... 428/35.7 |
| 2004/0254327 A1* | 12/2004 | Boyles et al. ............. 528/86 |
| 2005/0031855 A1 | 2/2005 | Heuer et al. .............. 428/332 |

FOREIGN PATENT DOCUMENTS

| | | | |
|---|---|---|---|
| EP | 110 221 | B1 | 4/1987 |
| JP | 02115222 | A * | 4/1990 |
| JP | 02251510 | A * | 10/1990 |
| JP | 02304741 | A * | 12/1990 |
| JP | 02304742 | A * | 12/1990 |
| JP | 2006137952 | A * | 6/2006 |

OTHER PUBLICATIONS

Brydson, J. (1999). Plastics Materials (7th Edition). (pp. 124-183). Elsevier. Online version available at: http://www.knovel.com/knovel2/Toc.jsp?BookID=440&VerticalID=0.*

* cited by examiner

POLYFORMALS AS A COEXTRUSION PROTECTIVE LAYER ON POLYCARBONATE

CROSS-REFERENCE TO RELATED APPLICATION

This application is a continuation-in-part of application Ser. No. 10/894,995 filed Jul. 20, 2004 now abandoned.

FIELD OF THE INVENTION

The present invention relates to multi-layer articles of manufacture and in particular to sheets.

SUMMARY OF THE INVENTION

A multi-layer article of manufacture is disclosed. The article contains a base layer that contains at least one thermoplastic resin and a second layer containing a thermoplastic (co)polyformal superimposed over the base layer. The (co)polyformal conforms to formulae (1a) or (1b),

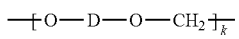

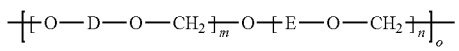

in which O-D-O and O-E-O independently denote a diphenolate group, -D- and -E- independently denote an aromatic group having 6 to 40 carbon atoms, k is a whole number from 1 to 1500, o stands for numbers from 1 to 1500, and m is z/o and n is (o-z)/o wherein z is 0 to o.

The multi-layer article that may prepared by co-extrusion exhibits improved properties.

BACKGROUND OF THE INVENTION

Multi-wall sheets are generally provided, for example, with a coextrusion layer or layers that contain UV absorbers on one or both its surfaces to protect them from damage (e.g. yellowing) by UV light. Other multi-layer products may also be protected in this way from damage by UV light.

The relevant art concerning multi-layer products is summarised below:

EP-A 0 110 221 discloses sheets of two layers of polycarbonate, wherein one layer contains at least 3 wt. % of a UV absorber. These sheets can be produced according to EP-A 0 110 221 by coextrusion.

EP-A 0 320 632 discloses molded articles of two layers of thermoplastic material, preferably polycarbonate, wherein one layer contains specially substituted benzotriazols as UV absorbers. EP-A 0 320 632 also discloses the production of these molded articles by coextrusion.

EP-A 0 247 480 discloses multi-layer sheets in which a layer of branched polycarbonate is present in addition to a layer of thermoplastic material, wherein the layer of polycarbonate contains specially substituted benzotriazols as UV absorbers. The production of these sheets by coextrusion is also disclosed.

EP-A 0 500 496 discloses polymer compositions, which are stabilised against UV light by means of special triazines and their use as an outer layer in multi-layer systems. Polycarbonate, polyester, polyamide, polyacetals, polyphenylene oxide and polyphenylene sulfide are named as polymers.

However, products known thus far are not completely satisfactory particularly with regard to long-term resistance to UV light (UV-stability).

According to the prior art, water bottles, such as e.g. 5-gallon bottles, do not have a multilayer construction (DE 19943642, DE 19943643, EP-A 0411433). The same applies to reusable milk bottles or baby bottles.

Polycarbonate containers are produced for example by extrusion blow moulding or injection blow moulding.

In extrusion blow moulding the granules are generally melted with a single-screw extruder and moulded through a die to form a free-standing parison, which is then enclosed by a blow mould which pinches the parison together at the lower end. Inside the mould the parison is inflated to give the parison the desired shape. After a cooling period the mould is opened and the blow moulded article can be removed (described in more detail e.g. in Brinkschröder, F. J. "Polycarbonate" in Becker, Braun, Kunststoff-Handbuch, Volume 3/1, Polycarbonate, Polyacetale, Polyester, Celluloseester, Carl Hanser Verlag, Munich, Vienna 1992, pages 257 to 264).

For extrusion blow moulding it is advantageous to use a highly pseudoplastic polycarbonate in order to obtain a high melt stability. Branched polycarbonates are particularly pseudoplastic.

Injection blow moulding is a combination of injection moulding and blow moulding.

The process takes place in three steps:
1) Injection moulding of the parison in the plastic temperature range of the polycarbonate
2) Inflation of the parison in the thermoplastic range of the polycarbonate (the core of the injection mould is also the blowing mandrel)
3) Stripping the blow moulded article and optionally cooling the blowing mandrel with air (described in more detail e.g. in Anders, S., Kaminski, A., Kappenstein, R., "Polycarbonate" in Becker/Braun, Kunststoff-Handbuch, Volume 3/1, Polycarbonate, Polyacetale, Polyester, Celluloseester, Carl Hanser Verlag, Munich, Vienna 1992, pages 223 to 225).

However, none of the products known from the prior art achieves satisfactory results in every respect, particularly as far as long-term stability in relation to hydrolysis is concerned. Water damages polycarbonate above 60° C. Extended contact with boiling water leads to molecular weight reduction, which is further accelerated in the presence of heat stabilisers such as organic phosphites. In addition, polycarbonates can be preferably alkaline-hydrolysed. Microwave radiation further accelerates this degradation.

In patents of the prior art no mention is ever made of hydrolysis protection layers to overcome this disadvantage.

Starting from the prior art the object was therefore to provide a multilayer sheet or coated containers such as e.g. water bottles or medical articles, which should be able to be sterilised in superheated steam, which display improved properties in comparison to the prior art, such as improved long-term stability in relation to hydrolysis in water, even at elevated temperatures, and in the acid and also the basic environment.

This object underlies the present invention.

This object is surprisingly achieved by coatings containing certain polyformals or copolyformals as the polymer basis.

The object is therefore to provide a multi-layer sheet having improved properties including improved long-term UV stability, thermal-ageing properties and resistance to hydrolysis.

This object is achieved surprisingly by protective layer which contains certain polyformals or copolyformals.

The products thus protected are surprisingly superior in terms of UV resistance and in particular with regard to resistance to hydrolysis.

This is particularly surprising, as the polyformals can be considered full acetals, which, according to the current doctrinal opinion of the person skilled in the art, are highly susceptible to hydrolysis, at least in an acid environment. However, in contrast to this, the coatings of polyformals are hydrolysis-stable even towards acid solutions and remain so even at higher temperatures.

The present invention thus provides a protective layer that contain polyformals or copolyformals of the general formulae (1a) and/or (1b),

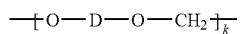
(1a)

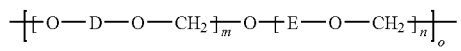
(1b)

in which the groups O-D-O and O-E-O stand for any diphenolate groups, in which -D- and -E- are aromatic groups having 6 to 40 carbon atoms, preferably $C_6$ to $C_{12}$ carbon atoms, which may contain one or more aromatic or condensed aromatic nuclei, optionally containing heteroatoms, and optionally include $C_1$-$C_{12}$-alkyl groups or halogen substituents and may contain aliphatic groups, cycloaliphatic groups, aromatic nuclei or heteroatoms as bridging links and in which k stands for a whole number from 1 to 1500, preferably from 2 to 1000, particularly preferably from 2 to 700 and most particularly preferably from 5 to 500 and in particular from 5 to 300, o stands for numbers from 1 to 1500, preferably from 1 to 1000, particularly preferably from 1 to 700 and most particularly preferably from 1 to 500 and in particular from 1 to 300, and m stands for a fractional number z/o and n for a fractional number (o-z)/o, wherein z stands for numbers from 0 to o.

Preferred structural elements of the polyformals and copolyformals according to the invention are derived from general structures of the formulae (2a), (2b), (2c) and (2d), wherein the brackets describe the diphenolate groups according to D und E as mentioned for formulae (1a) and (1b), in which $R^1$ and $R^2$, independently of each other, stand for H, linear or branched $C_1$-$C_{18}$-alkyl- or alkoxy groups, halogen such as Cl or Br or for an optionally substituted aryl- or aralkyl group, preferably for H or linear or branched $C_1$-$C_{12}$-alkyl-, particularly preferably for H or $C_1$-$C_8$-alkyl groups and most particularly preferably for H or methyl, X stands for a single bond, a $C_1$-$C_6$-alkylene-, $C_2$- to $C_5$-alkylidene, $C_5$-$C_6$-cycloalkylidene group, which may be substituted with $C_1$-$C_6$-alkyl, preferably methyl- or ethyl groups, or a $C_6$- to $C_{12}$-arylene group, which may optionally be condensed with further aromatic rings containing heteroatoms, wherein p stands for a whole number from 1 to 1500, preferably from 2 to 1000, particularly preferably from 2 to 700 and most particularly preferably from 5 to 500 and in particular from 5 to 300, p stands for numbers from 1 to 1500, preferably from 1 to 1000, particularly preferably from 1 to 700, most particularly preferably from 1 to 500 and in particular from 1 to 300 and q stands for a fractional number z/p and r for a fractional number (p-z)/p, wherein z stands for numbers from 0 to p.

The polyformals or copolyformals can thus be linear or branched.

The bisphenolate groups in formulae (1) and (2) are derived particularly preferably from the suitable bisphenols named below.

Examples of the bisphenols that form the basis of the general formula (1) are hydroquinone, resorcinol, dihydroxybiphenyls, bis-(hydroxyphenyl)-alkanes, bis-(hydroxyphenyl)-cycloalkanes, bis-(hydroxyphenyl)-sulfides, bis-(hydroxy-phenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropyl benzenes, as well as their core-alkylated and core-halogenated compounds, and also α,ω-bis-(hydroxyphenyl)-polysiloxanes.

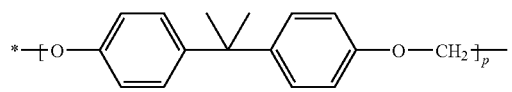
(2a)

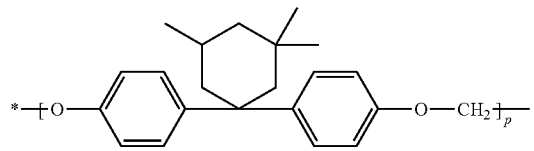
(2b)

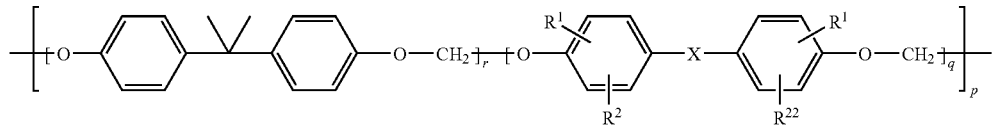
(2c)

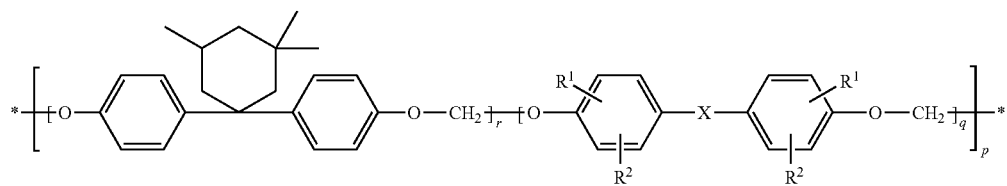
(2d)

Preferred bisphenols are for example 4,4'-dihydroxybiphenyl (DOD), 2,2-bis-(4-hydroxyphenyl)-propane (bisphenol A), 1,1-bis-(4-hydroxyphenyl)-3,3,5-trimethyl cyclohexane (bisphenol TMC), 1,1-bis-(4-hydroxyphenyl)-cyclohexane, 2,4-bis-(4-hydroxyphenyl)-2-methyl butane, 1,1-bis-(4-hydroxyphenyl)-1-phenyl ethane, 1,4-bis[2-(4-hydroxyphenyl) 2-propyl]benzene, 1,3-bis[2-(4-hydroxy-phenyl)-2-propyl]-benzene (bisphenol M), 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxy-phenyl)-2-methylbutane, 2,2-bis-(3,5-dichloro-4-hydroxyphenyl)-propane and 2,2-bis-(3,5-dibromo-4-hydroxyphenyl)-propane.

Particularly preferred bisphenols are, for example, 2,2-bis-(4-hydroxyphenyl)-propane (bisphenol A), 4,4'-dihydroxybiphenyl (DOD), 1,3-bis[2-(4-hydroxy-phenyl)-2-propyl]benzene (bisphenol M), 2,2-bis-(3,5-dimethyl-4-hydroxyphenyl)-propane, 1,1-bis-(4-hydroxyphenyl)-1-phenyl ethane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane (bisphenol TMC).

Most particularly preferred are 2,2-bis-(4-hydroxyphenyl)-propane (bisphenol A), 4,4'-dihydroxy biphenyl (DOD), 1,3-bis[2-(4-hydroxyphenyl)-2-propyl]-benzene (bisphenol M) and 1,1-bis-(4-hydroxyphenyl)-3,3,5-trimethyl cyclohexane (bisphenol TMC).

The bisphenols can be used both alone or in mixture with each other; both homopolyformals and copolyformals are included. The bisphenols are known from the literature or can be produced by processes known from the literature (see e.g. H. J. Buysch et al., Ullmann's Encyclopedia of Industrial Chemistry, VCH, New York 1991, 5$^{th}$ Ed., Vol. 19, p. 348).

The polyformals according to the invention can be deliberately branched in a controlled manner by the use of small amounts of trifunctional compounds known as branching agents. Some suitable branching agents are: phloroglucinol, 4,6-dimethyl-2,4,6-tri-(4-hydroxyphenyl) heptene-2; 4,6-dimethyl-2,4,6-tri-(4-hydroxyphenyl) heptane; 1,3,5-tri-(4-hydroxyphenyl) benzene; 1,1,1-tri-(4-hydroxyphenyl) ethane; tri-(4-hydroxyphenyl) phenyl methane; 2,2-bis-[4,4-bis-(4-hydroxyphenyl) cyclohexyl]propane; 2,4-bis-(4-hydroxyphenyl isopropyl) phenol; 2,6-bis-(2-hydroxy-5'-methyl benzyl)-4-methyl phenol; 2-(4-hydroxyphenyl)-2-(2,4-dihydroxyphenyl) propane; hexa-(4-(4-hydroxyphenyl isopropyl) phenyl) orthoterephthalic acid ester; tetra-(4-hydroxyphenyl) methane; tetra-(4-(4-hydroxyphenyl isopropyl)phenoxy) methane; α,α,α"-tris-(4-hydroxyphenyl)-1,3,5-triisopropyl benzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)methyl)benzene and in particular: 1,1,1-tri-(4-hydroxyphenyl)ethane and bis-(3-methyl-4-hydroxyphenyl)-2-oxo-2,3-dihydroindole.

The use of such branching agents leads to corresponding deviations in formulae (1) and (2) from their idealised structure. This means that according to the amount of branching agent used, structural units having three binding units, which can also be formed as ester functions, etc., depending on the branching agent used, are produced which are derived from the branching agents used.

The 0.05 to 2 mol % of branching agents or mixtures of branching agents that can optionally be incorporated, relative to diphenols used, can be added together with the diphenols but can also be added at a later stage of the synthesis.

Phenols such as phenol, alkylphenols such as cresol and 4-tert. butyl phenol, chlorophenol, bromophenol, cumyl phenol or mixtures thereof in amounts of 1-20 mol % preferably 2-10 mol % per mol bisphenol, are preferred as chain stoppers for the polyformals used as materials in the coextruded coating. Phenol, 4-tert. butyl phenol or cumyl phenol are preferred.

The polyformals and copolyformals of the formulae (1a) and (1b) or (2 a-d) may be produced, for example, by a solvent process, characterised in that the bisphenols and chain stoppers are reacted with methylene chloride or alpha, alpha-dichlorotoluene in a homogeneous mixture of methylene chloride or alpha, alpha-dichlorotoluene and a suitable high-boiling solvent, such as for example, N-methyl pyrrolidone (NMP), dimethyl formamide (DMF), dimethyl sulfoxide (DMSO), N-methyl caprolactam (NMC), chlorobenzene, dichlorobenzene, trichlorobenzene or tetrahydrofuran (THF) in the presence of a base, preferably sodium hydroxide or potassium hydroxide, at temperatures of 30 to 160° C. Preferred high-boiling solvents are NMP, DMF, DMSO and NMC, NMP, NMC, DMSO being particularly preferred and NMP and NMC being most particularly preferred. The reaction may be carried out in several stages. The optionally required separation of the cyclic impurities takes place after neutral washing of the organic phase by a precipitation process in or by fractionated kneading of the raw product with a solvent that dissolves the cyclic compounds, e.g. acetone. The cyclic impurities are dissolved almost completely in the solvent and may be almost completely separated off by kneading in portions and changing the solvent. By using e.g. ca 10 liters of acetone, which is added for example in 5 portions to a polyformal quantity of ca 6 kg, a cycle content of well below 1% may be achieved after kneading.

The cyclic polyformals and copolyformals may also be separated off by a precipitation process in suitable solvents, which act as non-solvents for the desired polymer and as solvents for the undesirable cycles. These are preferably alcohols or ketones.

The reaction temperature is 30° C. to 160° C., preferably 40° C. to 100° C., particularly preferably 50° C. to 80° C. and most particularly preferably 60° C. to 80° C.

The present invention thus provides the use of the polyformals and copolyformals disclosed for the production of multi-layer products, for example coextrudates such as multi-layer sheets, these multi-layer sheets themselves and a process for their production by coextrusion, as well as compositions containing these polyformals or copolyformals and UV absorbers.

The present invention also provides a product containing the cited multilayer sheet or other coated products based on polyformals. This product, which for example contains the cited multilayer sheet or is itself coated, is preferably selected from the group consisting of baby bottles, water bottles or medical articles that can be sterilised in superheated steam.

The present invention further provides a product that-contains the stated multi-layer sheet or other coated product based on polyformal. This product which, for example, contains the stated multi-layer sheet, is preferably selected from the group consisting of glazing, greenhouse, conservatory, veranda, car port, bus shelter, roofing, partition wall, pay kiosk, road sign, advertising board, display, lighting element, photovoltaic module and solar collector.

The multi-layer product according to the invention has numerous advantages. In particular, it has the advantage that the UV protective layer based on polyformal achieves a significant improvement in long-term resistance, in particular resistance to UV and hydrolysis. In addition, the sheet can be produced easily and inexpensively, all starting materials are available and inexpensive. The remaining positive properties of the polycarbonate, for example its good optical and mechanical properties, are not impaired, or are only negligibly impaired, in the multi-layer product according to the invention.

The multi-layer products according to the invention have further advantages over current products. The multi-layer products according to the invention may be produced by coextrusion. This offers advantages over a product produced by lacquering. Thus no solvents evaporate during coextrusion, as they do during lacquering.

In addition, the storage stability of lacquers is limited. Coextrusion does not have this disadvantage.

In addition, lacquers require costly technology. For example, they require explosion-protected units when using organic solvents, the recycling of solvents, and thus high investment in plant. Coextrusion does not have this disadvantage.

A preferred embodiment of the present invention is the so-called multi-layer sheet, wherein the base sheet includes polycarbonate and/or copolycarbonate and/or polyester and/or copolyester and/or polyester carbonates and/or polymethyl methacrylate and/or polyacrylates and/or blends of polycarbonate and polyesters and/or polymethyl methacrylates and the coextruded layer (coex layer) includes polyformals or copolyformals or blends of these with (co)polycarbonate and/or (co)polyesters.

According to the invention, multi-layer products in which the coex layer contains additionally 0 to 20% UV absorber and is 10 to 500 μm thick are preferred.

The multi-wall sheets may be twin-wall sheets, triple-wall sheets, quadruple-wall sheets etc. The multi-wall sheets may also have different profiles such as e.g. X profiles or XX profiles. In addition, the multi-wall sheets may also be corrugated multi-wall sheets.

A preferred embodiment of the present invention is a two-layer sheet, containing a layer of polycarbonate and a coex layer of polyformal or copolyformal or a polycarbonate-polyformal blend.

A further preferred embodiment of the present invention is a three-layer sheet containing a layer of polycarbonate as the base layer and two coex layers on top of this, each of which contains similarly or variously of polyformal or copolyformal or a polycarbonate-polyformal blend.

In a particular embodiment, the multi-layer products are transparent.

A preferred embodiment of the present invention is the cited multilayer sheet or various types of bottle, the base layer consisting of polycarbonate and/or copolycarbonate and/or polyester and/or copolyester and/or polyester carbonates and/or polymethyl methacrylate and/or polyacrylates and/or blends of polycarbonate and polyesters and/or polymethyl methacrylates and the coex layer consisting of polyformals or copolyformals or blends thereof with (co)polycarbonate and/or (co)polyesters.

Multilayer products in which the hydrolysis protection layer is 1 to 5000 μm thick, preferably 5 to 2500 μm, most particularly preferably 10 to 500 μm, are preferred according to the invention.

Containers within the meaning of the present invention can be used for the packaging, storage or transport of liquids, solids or gases. Containers for the packaging, storage or transport of liquids are preferred (liquid containers), containers for the packaging, storage or transport of water (water bottles) being particularly preferred.

Containers within the meaning of the invention are blown containers having a volume of preferably 0.1 l to 50 l, preferably 0.5 l to 50 l, volumes of 1 l, 5 l, 12 l and 20 l being most particularly preferred.

Water bottles having a volume of 3 to 5 gallons are most particularly preferred.

The containers have an empty weight of preferably 0.1 g to 3000 g, by preference 50 g to 2000 g and particularly preferably 650 g to 900 g.

The wall thicknesses of the containers are preferably 0.5 mm to 5 mm, by preference 0.8 mm to 4 mm.

Containers within the meaning of the present invention have a length of preferably 5 mm to 2000 mm, particularly preferably 100 mm to 1000 mm.

The containers have a maximum perimeter of preferably 10 mm to 250 mm, by preference 50 mm to 150 mm and most particularly preferably 70 to 90 mm.

Containers within the meaning of the invention preferably have a bottle neck of a length of preferably 1 mm to 500 mm, by preference 10 mm to 250 mm, particularly preferably 50 mm to 100 mm and most particularly preferably 70 to 80 mm.

The wall thickness of the bottle neck of the containers varies between preferably 0.5 mm and 10 mm, particularly preferably between 1 mm and 10 mm and most particularly preferably between 5 mm and 7 mm.

The diameter of the bottle neck varies between preferably 5 mm and 200 mm. 10 mm to 100 mm are particularly preferred, and 45 mm to 75 mm are most particularly preferred.

The bottle base of the containers according to the invention has a diameter of preferably 10 mm to 250 mm, preferably 50 mm to 150 mm and most particularly preferably 70 to 90 mm.

Containers within the meaning of the present invention can have any geometrical shape, they can be e.g. round, oval or polygonal or angular with e.g. 3 to 12 sides. Round, oval and hexagonal shapes are preferred.

The design of the containers can be based on any surface texture. The surface textures are preferably smooth or ribbed. The containers according to the invention can also display several different surface textures. Ribs or beads can run around the perimeter of the containers. They can be any distance apart or can be several different distances apart. The surface textures of the containers according to the invention can display roughened or integrated textures, symbols, ornaments, coats of arms, company logos, trademarks, monograms, manufacturer's instructions, material descriptions and/or volume information.

The containers according to the invention can display any number of handles, which can be located on the side, top or bottom. The handles can be external or can be integrated into the contour of the container. The handles can be folding or fixed. The handles can be of any shape, e.g. oval, round or polygonal. The length of the handles is preferably from 0.1 mm to 180 mm, preferably from 20 mm to 120 mm.

In addition to the polycarbonate according to the invention the containers according to the invention can also contain other substances to a small extent, e.g. seals made from rubber or handles made from other materials.

The containers according to the invention are preferably produced by extrusion blow moulding or injection blow moulding.

In a preferred embodiment of the process for producing the containers according to the invention, the polycarbonates according to the invention are processed on extruders having a smooth or grooved, preferably a smooth, feed section.

The drive power of the extruder is chosen according to the screw diameter. By way of example, with a screw diameter of 60 mm the drive power of the extruder is approx. 30 to 40 kW, with a screw diameter of 90 mm it is approx. 60 to 70 kW.

The universal three-section screws conventionally used in the processing of engineering thermoplastics are suitable.

For the production of containers having a volume of 1 l a screw diameter of 50 to 60 mm is preferred. For the production of containers having a volume of 20 l a screw diameter of 70 to 100 mm is preferred. The length of the screws is preferably 20 to 25 times the diameter of the screw.

In the case of blow moulding, the blow mould is preferably heated to 50 to 90° C. to obtain a sparkling and high-quality container surface.

To ensure uniform and effective heating of the blow mould, the base area and the jacket area can be heated separately.

The blow mould is preferably closed with a compressive force of 1000 to 1500 N per cm of pinch-off weld length.

Before processing, the polycarbonate according to the invention is preferably dried so that the optical quality of the containers is not diminished by streaks or bubbles and the polycarbonate is not degraded hydrolytically during processing. The residual moisture content after drying is preferably less than 0.01 wt. %. A drying temperature of 120° C. is preferred. Lower temperatures do not guarantee adequate drying, whilst at higher temperatures there is a risk of the granules of polycarbonate sticking together and then no longer being able to be processed. Dry-air dryers are preferred.

The preferred melt temperature during processing of the polycarbonate according to the invention is 230° to 300° C.

The containers according to the invention can be used for the packaging, storage or transport of liquids, solids or gases. The embodiment as containers which are used for example for the packaging, storage or transport of liquids is preferred. The embodiment as a water bottle which can be used for example for the packaging, storage or transport of water is particularly preferred.

A preferred embodiment of the invention is the one wherein the containers made from branched polycarbonate are characterised in that the branched polycarbonate contains THPE and/or IBC as branching agent and wherein alkyl phenols are used in the production of the branched polycarbonate and wherein the container is a water bottle.

A particularly preferred embodiment of the invention is the one wherein the container made from branched polycarbonate is characterised in that the branched polycarbonate contains THPE and/or IBC as branching agent and wherein phenol is used in the production of the branched polycarbonate and wherein the polycarbonate has a melt viscosity of 5500 to 7000 Pas at 260° C. and a shear rate of 10 $s^{-1}$ and a melt viscosity of 900 to 1100 Pas at 260° C. and a shear rate of 1000 $s^{-1}$ and has an MFR (melt flow index, measured according to ISO 1133) of <3.5 g/10 min and wherein the container is a water bottle.

A particularly preferred embodiment of the invention is further the one wherein the container made from branched polycarbonate is characterised in that the branched polycarbonate contains 1,1,1-tris-(4-hydroxyphenyl) ethane (THPE) and/or 3,3-bis-(3-methyl-4-hydroxyphenyl)-2-oxo-2,3-dihydroindole (IBC, isatin bis-cresol) as branching agent and wherein para-tert-butyl phenol and/or para-cumyl phenol and/or para-isooctyl phenol are used in the production of the branched polycarbonate and wherein the container is a water bottle.

Under the last cited embodiment the one that is particularly preferred is the one wherein the branched polycarbonate contains exclusively 1,1,1-tris-(4-hydroxyphenyl) ethane (THPE) and/or 3,3-bis-(3-methyl-4-hydroxyphenyl)-2-oxo-2,3-dihydroindole (IBC, isatin bis-cresol) as branching agent and wherein para-tert-butyl phenol and/or para-cumyl phenol and/or para-isooctyl phenol are used in the production of the branched polycarbonate.

Under the last cited embodiment the one that is particularly preferred is the one wherein the branched polycarbonate contains exclusively 1,1,1-tris-(4-hydroxyphenyl) ethane (THPE) and/or 3,3-bis-(3-methyl-4-hydroxyphenyl)-2-oxo-2,3-dihydroindole (IBC, isatin bis-cresol) as branching agent and wherein para-isooctyl phenol is used in the production of the branched polycarbonate.

In a particular embodiment the multilayer products are transparent.

Both the base material and the coex-layer(s) in the multilayer sheets according to the invention may contain additives.

The coex layer may contain in particular UV absorbers and mold release agents.

The UV absorbers or mixtures thereof are generally present in concentrations of 0-20 wt. %. 0.1 to 20 wt. % being preferred, 2 to 10 wt. % being preferred in particular and 3 to 8 wt. % being preferred most particularly. These quantities apply generally, but must be specified individually by the person skilled in the art by a few routine tests depending on the UV absorber. If two or more coex layers are present, the proportion of UV absorber in these layers may also be different.

The present application provides the corresponding compositions of polyformals or copolyformals and UV absorbers.

The concentrations of the UV absorber given generally above and given below for individual UV absorbers apply also for these compositions.

Examples of UV absorbers, which may be used according to the invention, and their preferred concentrations in the coating are given below.

a) Benzotriazol derivatives of formula (I):

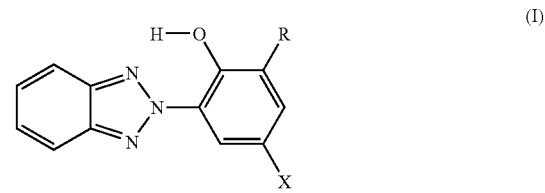

(I)

In formula (I) R and X are the same or different and mean H or alkyl or alkylaryl.

Tinuvin 329 in which X=1,1,3,3-tetramethylbutyl and R=H

Tinuvin 350 in which X=tert. butyl and R=2-butyl

Tinuvin 234 in which X=R=1,1-dimethyl-1-phenyl are preferred.

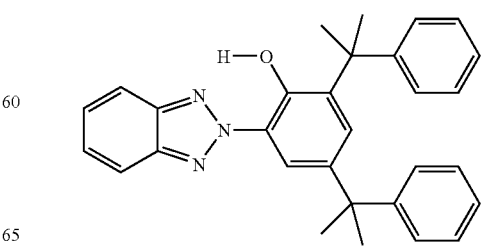

Tinuvin 234

Preferred range: 0.00001-1.5 wt. % to 2-20 wt. %, particularly preferably 0.01-1.0 wt. % to 3-10 wt. % most particularly preferably 0.1-0.5 wt. % to 4-8 wt. %.

b) Dimeric benzotriazole derivatives of formula (II):

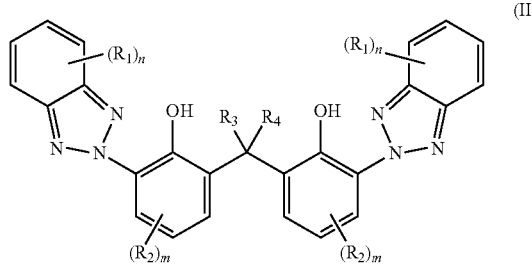

In formula (II) $R^1$ and $R^2$ are the same or different and mean H, halogen, $C_1$-$C_{10}$-alkyl, $C_5$-$C_{10}$-cycloalkyl, $C_7$-$C_{13}$-aralkyl, $C_6$-$C_{14}$-aryl, —$OR^5$ or —(CO)—O—$R^5$ in which $R^5$=H or $C_1$-$C_4$-alkyl.

In formula (II) $R^3$ and $R^4$ are also the same or different and mean H, $C_1$-$C_4$-alkyl, $C_5$-$C_6$-cycloalkyl, benzyl or $C_6$-$C_{14}$-aryl.

In formula (II) m means 1, 2 or 3 and n 1, 2, 3 or 4.

Tinuvin 360 in which $R^1$=$R^3$=$R^4$=H; n=4; $R^2$=1,1,3,3-tetramethylbutyl;
m=1 is preferred.

Preferred ranges: 0.00001-1.5 wt. % to 2-20 wt. %, particularly preferred 0.01-1.0 wt. % to 3-10 wt. %, most particularly preferred 0.1-0.5 wt. % to 4-8 wt. %.

b1) Dimeric benzotriazole derivatives according to formula (III):

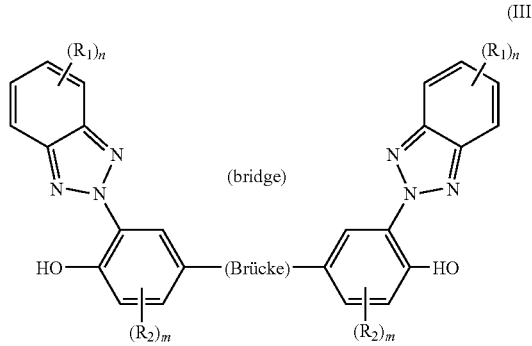

wherein the bridge means

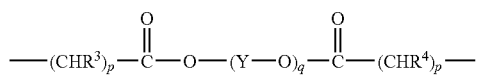

$R^1$, $R^2$, m and n have the meaning given for formula (II) and in which
p is a whole number from 0 to 3,
q is a whole number from 1 to 10,
Y is equal to —$CH_2$—$CH_2$—, —$(CH_2)_3$—, —$(CH_2)_4$—, —$(CH_2)_5$—, —$(CH_2)_6$—, or $CH(CH_3)$—$CH_2$— and
$R^3$ and $R^4$ have the meaning given for formula (II).

Tinuvin 840 in which $R^1$=H; n=4; $R^2$=tert. butyl; m=1; $R^2$ is placed in ortho position to the OH group; $R^3$=$R^4$=H; p=2; Y=—$(CH_2)_5$—; q=1, is preferred.

Preferred ranges: 0.00001-1.5 wt. % to 2-20 wt. %, particularly preferred 0.01-1.0 wt. % to 3-10 wt. %, most particularly preferred 0.1-0.5 wt. % to 4-8 wt. %.

c) Triazine derivatives according to formula (IV):

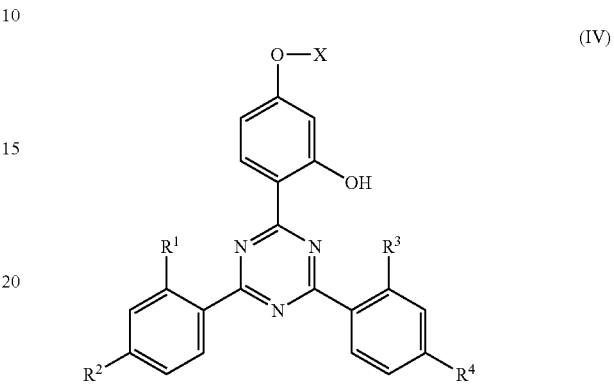

in which
$R^1$, $R^2$, $R^3$, $R^4$ in formula (IV) are the same or different and are H or alkyl or CN or halogen and X is equal to alkyl.

Tinuvin 1577 in which $R^1$=$R^2$=$R^3$=$R^4$=H; X=hexyl is preferred.

Cyasorb UV-1164 in which $R^1$=$R^2$=$R^3$=$R^4$=methyl; X=octyl.

Preferred ranges: 0.00001-1.0 wt. % to 1.5-10 wt. %, particularly preferred 0.01-0.8 wt. % to 2-8 wt. %, most particularly preferred 0.1-0.5 wt. % to 3-7 wt. %.

d) Triazine derivatives of the following formula (IV a)

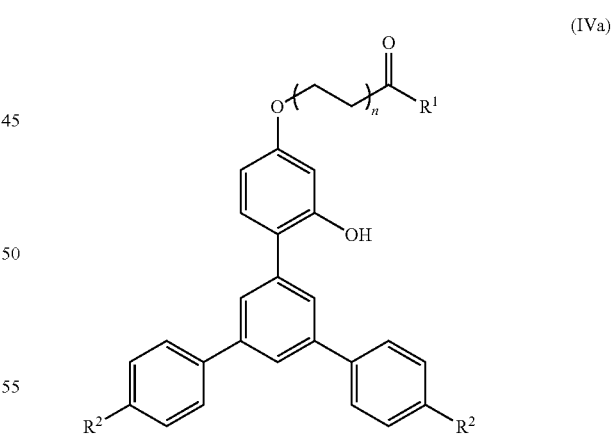

in which
$R^1$ means equal to $C_1$-alkyl to $C_{17}$-alkyl
$R^2$ means equal to H or $C_1$-alkyl to $C_4$-alkyl and
n is equal to 0 to 20.

Preferred ranges: 0.00001-1.0 wt. % to 1.5-10 wt. %, particularly preferred 0.01-0.8 wt. % to 2-8 wt. %, most particularly preferred 0.1-0.5 wt. % to 3-7 wt. %.

e) Dimeric triazine derivatives of formula (V):

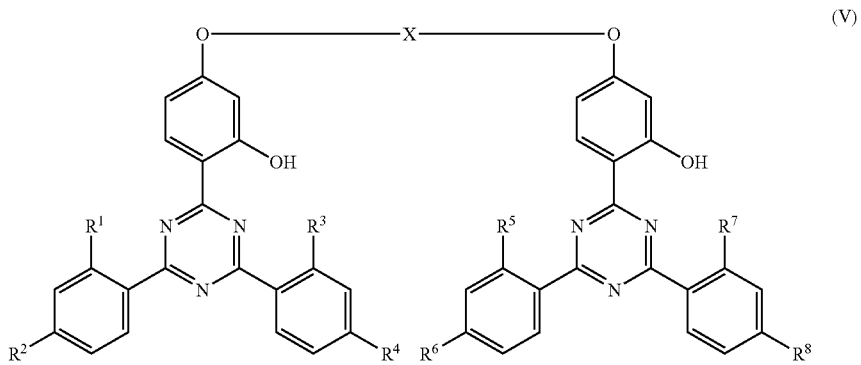

in which
$R^1, R^2, R^3, R^4, R^5, R^6, R^7, R^8$ in formula (V) maybe the same or different and mean H or alkyl or CN or halogen
and
X is equal to alkyl or —(CH$_2$CH$_2$—O—)n-C(=O)—.

Preferred ranges: 0.00001-1.0 wt. % to 1.5-10 wt. %, particularly preferred 0.01-0.8 wt. % to 2-8 wt. %, most particularly preferred 0.1-0.5 wt. % to 3-7 wt. %.

f) diaryl cyanoacrylates of formula (VI):

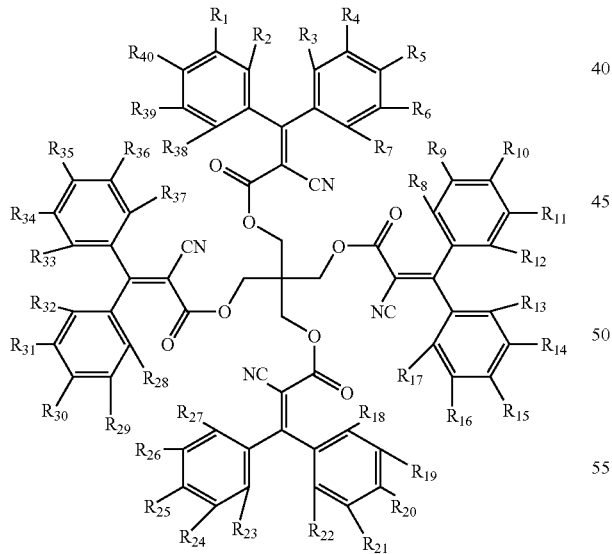

in which
$R_1$ to $R_{40}$ maybe the same or different and mean H, alkyl, CN or halogen.
Uvinul 3030 in which R1 to R40=H is preferred here.

Preferred ranges: 0.00001-1.5 wt. % to 2-20 wt. %, particularly preferred 0.01-1.0 wt. % to 3-10 wt. %, most particularly preferred 0.1-0.5 wt. % to 4-8 wt. %.

The UV absorbers selected from the group consisting of Tinuvin 360,
Tinuvin 1577 and Uvinul 3030 are most particularly preferred.

Tinuvin 360:

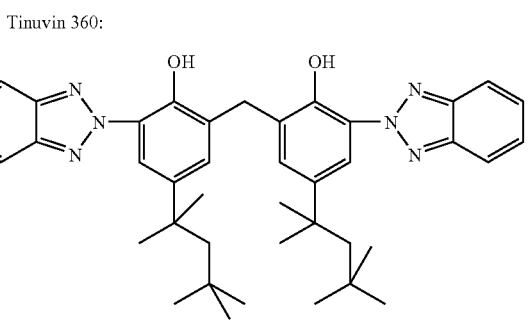

Tinuvin 1577

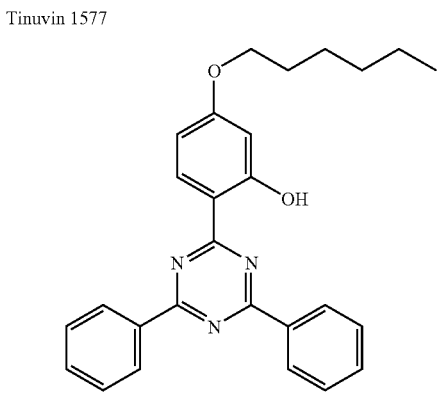

Uvinul 3030

-continued

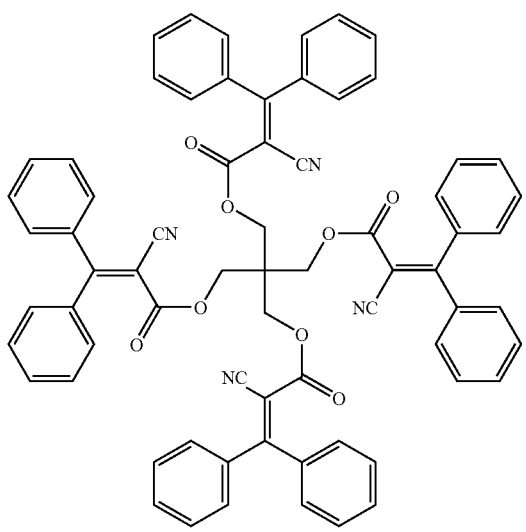

The stated UV absorbers are available commercially.

In addition to the UV stabilisers, the layers may contain other conventional processing auxiliary substances, in particular mold release agents and flow promoters as-well as the stabilisers conventionally used in polycarbonates in particular thermal stabilisers and also dyes, optical brighteners and inorganic pigments.

Layers of all known polycarbonates are suitable as further layers in addition to the polyformal and copolyformal layers, in particular as the base layer of the multi-layer products according to the invention.

Suitable polycarbonates are for example homopolycarbonates, copolycarbonates and thermoplastic polyestercarbonates.

They preferably have average molecular weights $\overline{M}_w$ of 18,000 to 40,000, preferably of 26,000 to 36,000 and in particular of 28,000 to 35,000, determined by measuring the relative solution viscosity in dichloromethane or in mixtures of equal quantities by weight of phenol/o-dichlorobenzene calibrated by light scattering.

For the production of polycarbonates, refer for example to "Schnell, Chemistry and Physics of Polycarbonate, Polymer Reviews, Vol. 9, Interscience Publishers, New York, London, Syndey, 1964" and to "D.C. PREVORSEK, B. T. DEBONA and Y. KESTEN, Corporate Research Center, Allied Chemical Corporation, Moristown, N.J. 07960, 'Synthesis of Poly (ester)carbonate Copolymers' in Journal of Polymer Science, Polymer Chemistry Edition, Vol. 19, 75-90 (1980)", and to "D. Freitag, U. Grigo, P. R. Müller, N. Nouvertne, BAYER AG, 'Polycarbonates' in Encyclopedia of Polymer Science and Engineering, Vol. 11, Second Edition, 1988, pages 648-718" and finally to "Dres. U. Grigo, K. Kirchner and P. R. Müller 'Polycarbonate', in Becker/Braun, Kunststoff-Handbuch, Vol. 3/1, Polycarbonate, Polyacetale, Polyester, Celluloseester, Carl Hanser Verlag Munich, Vienna 1992, Pages 117-299".

Polycarbonates are preferably produced by the interfacial polycondensation process or the melt-transesterification process, production being illustrated below by the example of the interfacial polycondensation process.

The compounds preferably to be used as starting compounds are bisphenols of the general formula

HO-Z-OH, in which

Z is a divalent organic group having 6 to 30 carbon atoms, which contains one or more aromatic groups.

Examples of such compounds are bisphenols that belong to the group of dihydroxy diphenyls, bis(hydroxyphenyl)alkanes, indane bisphenols, bis(hydroxyphenyl)ethers, bis(hydroxyphenyl)sulfones, bis(hydroxyphenyl)ketones and α,α'-bis(hydroxyphenyl)-diisopropyl benzenes.

Particularly preferred bisphenols, which belong to the above-mentioned groups of compounds are bisphenol A, tetraalkyl bisphenol A, 1,3-bis-[2-(4-hydroxy-phenyl)-2-propyl]benzene (bisphenol M), 1,1-bis-[2-(4-hydroxyphenyl)-2-propyl]benzene, 1,1-bis-(4-hydroxyphenyl)-3,3,5-trimethyl cyclohexane (BP-TMC) and also optionally mixtures thereof.

The bisphenol compounds to be used according to the invention are preferably reacted with carbonic acid compounds, in particular phosgene, or in the melt transesterification process with diphenyl carbonate or dimethyl carbonate.

Polyester carbonates are preferably obtained by reacting the previously mentioned bisphenols, at least one aromatic dicarboxylic acid and optionally carbonic acid equivalents. Suitable aromatic dicarboxylic acids are for example phthalic acid, terephthalic acid, isophthalic acid, 3,3'-or 4,4'-diphenyl dicarboxylic acid and benzophenone dicarboxylic acids. Some, up to 80 mol %, preferably from 20 to 50 mol % of the carbonate groups in the polycarbonates may be substituted by aromatic dicarboxylic acid ester groups.

Inert organic solvents used in the interfacial polycondensation process are for example dichloromethane, the various dichloroethanes and chloropropane compounds, tetrachloromethane, trichloromethane, chlorobenzene and chlorotoluene; chlorobenzene or dichloromethane or mixtures of dichloromethane and chlorobenzene are preferred.

The interfacial polycondensation reaction maybe accelerated by catalysts such as tertiary amines, in particular N-alkyl piperadine or onium salts. Tributyl amine, triethyl amine and N-ethyl piperadine are preferably used. In the melt transesterification process, the catalysts named in DE-A 4238123 are preferably used.

The polycarbonates may be branched in a conscious and controlled manner by using small quantities of branching agents. Some suitable branching agents are: phloroglucinol, 4,6-dimethyl-2,4,6-tri-(4-hydroxyphenyl)-heptene-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl methane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methyl-benzyl)-4-methyl phenol; 2-(4-hydroxyphenyl)-2-(2, 4-dihydroxyphenyl)-propane; hexa-(4-(4-hydroxyphenyl-isopropyl)-phenyl)-orthoterephthalic acid ester; tetra-(4-hydroxyphenyl)-methane; tetra-(4-(4-hydroxyphenyl-isopropyl)-phenoxy)-methane; α,α',α''-tris-(4-hydroxyphenyl)-1,3,5-triisopropyl benzene; 2,4-dihydroxybenzoic acid; trimesic acid; cyanuric chloride; 3,3-bis-(3-methyl-4-hydroxyphenyl)-2-oxo-2,3-dihydroindol; 1,4-bis-(4',4''-dihydroxytriphenyl)-methyl)-benzene and in particular 1,1,1-tri-(4-hydroxyphenyl)-ethane and bis-(3-methyl-4-hydroxyphenyl)-2-oxo-2,3-dihydroindol.

The 0.05 to 2 mol %, in relation to the diphenols used, of branching agents, or mixtures of branching agents, optionally also to be used maybe used together with the diphenols, but may also be added at a later stage of synthesis.

Phenols such as phenol, alkylphenols such as cresol and 4-tert. butyl phenol, chlorophenol, bromophenol, cumyl phenol or mixtures thereof maybe used in quantities of 1-20 mol %, preferably 2-10 mol % per mol bisphenol as chain stoppers. Phenol, 4-tert. butyl phenol or cumyl phenol are preferred.

Chain stoppers and branching agents maybe added to the synthesis separately but also together with the bisphenol.

The production of polycarbonates by the melt transesterification process is disclosed for example in DE-A 42 38 123.

Preferred polycarbonates are the homopolycarbonate based on bisphenol A, the homopolycarbonate based on 1,1-bis-(4-hydroxyphenyl)-3,3,5-trimethyl cyclo-hexane and the copolycarbonates based on the two monomers bisphenol A and 1,1-bis-(4-hydroxyphenyl)-3,3,5-trimethyl cyclohexane and the copolycarbonates based on the two monomers bisphenol A and 4,4'-dihydroxy diphenyl (DOD).

The homopolycarbonate based on bisphenol A is particularly preferred.

All thermoplastics used in the products according to the invention may contain stabilisers. Suitable stabilisers are for example phosphines, phosphites or Si-containing stabilisers and other compounds disclosed in EP-A 0 500 496. Examples are triphenyl phosphites, diphenylalkyl phosphites, phenyl dialkyl phosphites, tris-(nonylphenyl)phosphite, tetrakis-(2,4-di-tert.-butylphenyl)-4,4'-biphenylene-diphosphonite and triaryl phosphite. Triphenyl phosphine and tris-(2,4-di-tert. butyl phenyl) phosphite are particularly preferred.

These stabilisers may be present in all layers of the multi-layer sheet according to the invention. That means both in the so-called base and in the so-called coex layer or layers. Different additives and concentrations of additives maybe present in each layer.

Furthermore, the multi-layer sheet according to the invention may contain 0.01 to 0.5 wt. % of esters or partial esters of mono- to hexavalent alcohols, in particular of glycerine, of pentaerythritol or of guerbet alcohols.

Monovalent alcohols are for example stearyl alcohol, palmityl alcohol and guerbet alcohol.

A divalent alcohol is for example glycol.

A trivalent alcohol is for example glycerine.

Tetravalent alcohols are for example pentaerythritol and mesoerythritol.

Pentavalent alcohols are for example arabitol, ribitol and xylitol.

Hexavalent alcohols are for example mannitol, glucitol (sorbitol) and dulcitol.

The esters are preferably the monoesters, diesters, triesters, tetraesters, pentaesters and hexaesters or mixtures thereof, in particular statistical mixtures of-saturated aliphatic $C_{10}$ to $C_{36}$-monocarboxylic acids and optionally hydroxy-monocarboxylic acids, preferably with saturated, aliphatic $C_{14}$ to $C_{32}$-monocarboxylic acids and optionally hydroxy-monocarboxylic acids.

The commercially obtainable fatty acid esters, in particular of pentaerythritol and glycerine, may contain <60% differing partial esters, depending on the production method.

Saturated, aliphatic monocarboxylic acids having 10 to 36 carbon atoms are, for example, caprinic acid, lauric acid, myristinic acid, palmitic acid, stearic acid, hydroxystearic acid, arachic acid, behenic acid, lignoceric acid, cerotinic acid and montanic acid.

Preferred saturated aliphatic monocarboxylic acids having 14 to 22 carbon atoms are for example myristinic acid, palmitic acid, stearic acid, hydroxystearic acid, arachic acid and behenic acid.

Saturated aliphatic monocarboxylic acids such as palmitic acid, stearic acid and hydroxystearic acid are particularly preferred. The saturated aliphatic $C_{10}$ to $C_{36}$-carboxylic acids and the fatty acid esters are per se either known from the literature or maybe produced by processes known from the literature. Examples of pentaerythritol fatty acid esters are those of the particularly preferred monocarboxylic acids named above.

Esters of pentaerythritol and glycerine with stearic acid and palmitic acid are particularly preferred.

Esters of guerbet alcohols and of glycerine with stearic acid and palmitic acid and optionally hydroxystearic acid are particularly preferred.

These esters maybe present both in the base and in the coex layer or layers. Different additives or concentrations maybe present in each layer.

The multi-layer sheets according to the invention may contain antistatics.

Examples of antistatics are cation-active compounds, for example quaternary ammonium-, phosphonium- or sulfonium salts, anion-active compounds, for example alkyl sulfonates, alkyl sulfates, alkyl phosphates, carboxylates in the form of alkali- or earth alkali metal salts, non-ionogenic compounds, for example polyethylene glycol esters, polyethylene glycol ethers, fatty acid esters, ethoxylated fatty amines. Preferred antistatics are non-ionogenic compounds.

These antistatics may be present both in the base and in the coex layer or layers. Different additives and or concentrations may be present in each layer. They are preferably used in the coex layer or layers.

The multi-layer sheets according to the invention may contain organic dyes, inorganic colour pigments, fluorescent dyes and, particularly preferably, optical brighteners.

These dyes may be present both in the base and in the coex layer or layers. Different additives and concentrations may be present in each layer.

All molding compositions used for the production of the multi-layer sheet according to the invention, their feedstocks and solvents may be contaminated with impurities from production and storage, the aim being to work with starting materials that are as clean as possible.

The individual components of the molding compositions maybe mixed in the known way successively or simultaneously and either at room temperature or at a higher temperature.

The additives, in particular the UV absorbers and other previously-mentioned additives, are incorporated into the molding compositions for the sheets according to the invention preferably in the known way by mixing polymer granulate with the additives at temperatures of approximately 200 to 330° C. in conventional units such as internal kneaders, single-screw extruders and twin-shaft extruders, for example by melt compounding or melt extrusion or by mixing the solutions of the polymer with solutions of the additives and then evaporating the solvents in the known way. The proportion of the additives in the molding compositions maybe varied within broad limits and depends on the desired properties of the molding composition. The total proportion of additives in the molding composition is preferably approximately up to 20 wt. %, preferably 0.2 to 12 wt. % in relation to the weight of the molding composition.

The UV absorbers maybe incorporated into the molding compositions for example by mixing solutions of the UV absorbers and optionally other previously-named additives with solutions of the plastics in suitable organic solvents such as $CH_2Cl_2$, halogen alkanes, halogen aromatics, chlorobenzene and xylenes. The substance mixtures are then preferably homogenised in the known way by extrusion; the solution mixtures are preferably removed in the known way by evaporating out the solvent followed by extrusion, for example compounded.

It is possible to process the multi-layer sheets according to the invention e.g. by deep drawing or by surface processing such as e.g. providing with scratch-resistant lacquers, water-repelling layers and similar and the products produced by these processes are also provided by the present invention.

Coextrusion per se is known from the literature (see for example EP-A 0 110 221 and EP-A 0 110 238). In the present case the process is preferably carried out as follows. Extruders for the production of the core layer and top layer(s) are connected to a coextrusion adapter. The adapter is constructed in such a way that the melt forming the top layer(s) is bonded in a thin layer to the melt of the core layer. The multi-layer melt strand thus produced is then shaped as required (multi-wall or solid sheet) in the nozzle connected behind it. The melt is then cooled under controlled conditions in the known way by calendaring (solid sheet) or vacuum calibration (multi-wall sheet) and then cut to length. After calibration, a tempering oven may optionally be used to eliminate tension. Instead of fitting an adapter in front of the nozzle, the nozzle itself may also be designed in such a way that the melts are joined together there.

The invention is further explained by the following examples without being restricted to them. The examples according to the invention represent only preferred embodiments of the present invention.

EXAMPLES

Example 1

Synthesis of the Homopolyformal from Bisphenol TMC:

7 kg (22.55 mol) bisphenol TMC, 2.255 kg (56.38 mol) sodium hydroxide pellets and 51.07 g (0.34 mol) finely ground p-tert. butyl phenol (Aldrich) in 500 ml methylene chloride are added to a solvent mixture of 28.7 kg methylene chloride and 40.18 kg N-methyl-2-pyrrolidone (NMP) whilst stirring in nitrogen protective gas. After homogenising, the mixture is refluxed (78° C.) and stirred for one hour at this temperature. After cooling to 25° C., the reaction charge is diluted with 35 l methylene chloride and 20 l demineralised water. The charge is washed with water in a separator until neutral and salt-free (conductivity <15 μS·cm$^{-1}$). The organic phase from the separator is separated off and the solvent exchange of methylene chloride for chlorobenzene is carried out in an evaporation tank. The material is then extruded in a ZSK 32 evaporation extruder at a temperature of 270° C. and then granulated. This synthesis procedure is carried out twice. After disposing of first runnings, a total of 9.85 kg polyformal is obtained as a transparent granulate. This still contains lower-molecular cyclic formals as an impurity. The material is divided into two parts and each is left to swell over night with ca 5 l acetone. The compositions obtained are then kneaded with several portions of fresh acetone until no further cycles maybe detected. After combining the cleaned material and dissolving it in chlorobenzene, it is extruded again in the evaporation extruder at 280° C. After disposing of first runnings, a total of 7.31 kg polyformal is obtained as a transparent granulate.

Analysis:

Molecular weight Mw=38345, Mn=20138, D=1.90 by GPC (calibration against polycarbonate).

Glass transition temperature Tg=170.8° C.

Relative solution viscosity in methylene chloride (0.5 g/100 ml solution)=1.234

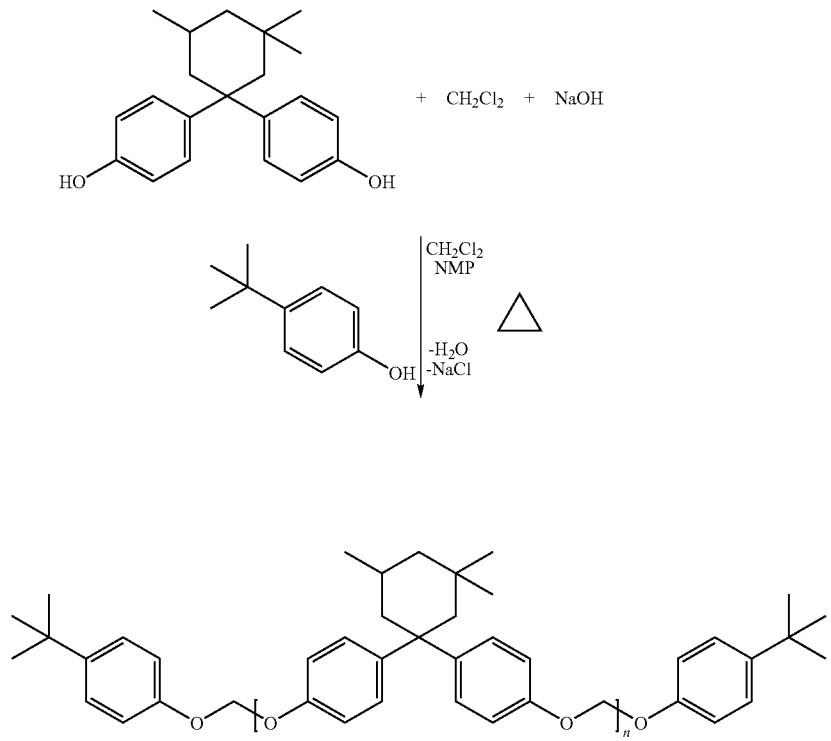

Absence of cycles from polymer demonstrated by GPC (oligomers in lower-molecular range) and MALDI-TOF (molar mass of the cycles in comparison with molar mass of the open-chain analogues)

exchange of methylene chloride for chlorobenzene is carried out in an evaporation tank. The material is then extruded in a ZSK 32 evaporation extruder at a temperature of 200° C. and then granulated. This synthesis procedure is carried out twice.

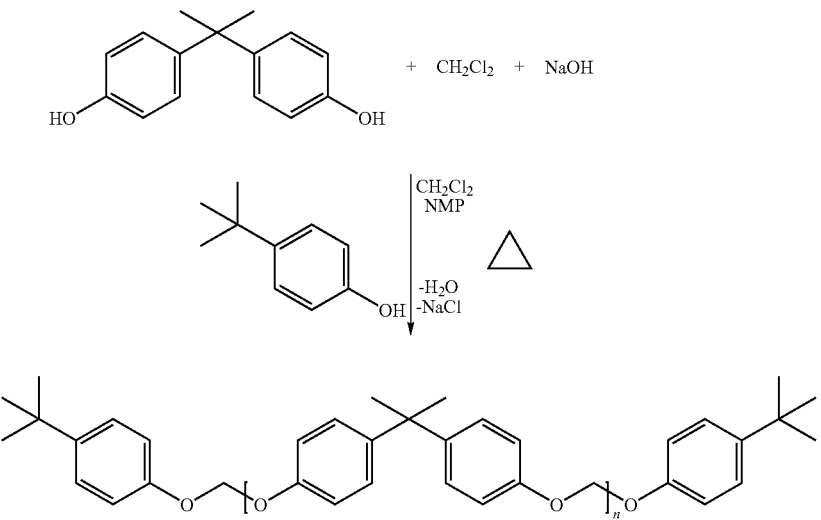

Example 2

Homopolyformal from Bisphenol A:

7 kg (30.66 mol) bisphenol A (Bayer AG), 3.066 kg (76.65 mol) sodium hydroxide pellets and 69.4 (0.462 mol) finely ground p-tert. butyl phenol (Aldrich) in 500 ml methylene chloride are added to a solvent mixture of 28.7 kg methylene chloride and 40.18 kg N-methyl-2-pyrrolidone (NMP) whilst stirring in nitrogen protective gas. After homogenising, the mixture is refluxed (78° C.) and stirred for one hour at this temperature. After cooling to 25° C., the reaction charge is diluted with 20 l methylene chloride and 20 l demineralised water. The charge is washed with water in a separator until neutral and salt-free (conductivity <15 µS·cm$^{-1}$). The organic phase from the separator is separated off and solvent After disposing of first runnings, a total of 11.99 kg polyformal is obtained as a transparent granulate.

Analysis:
Molecular weight Mw=31732, Mn=3465 by GPC (calibration against polycarbonate). The cycles are not separated here. It is not possible to swell the material with acetone, and the separation of the cycles is thus also impossible.
Glass transition temperature Tg=89° C.
Relative solution viscosity in methylene chloride (0.5 g/100 ml solution)=1.237/1.239 (double measurement)

Example 3

Synthesis of the Copolyformal from Bisphenol TMC and Bisphenol A

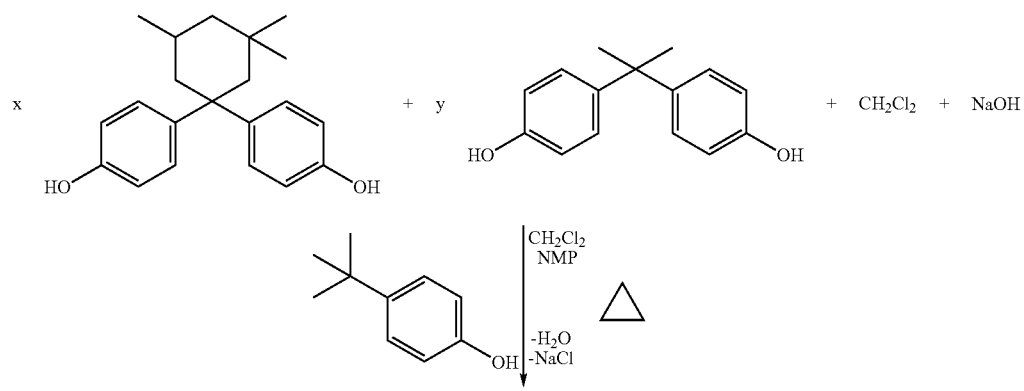

-continued

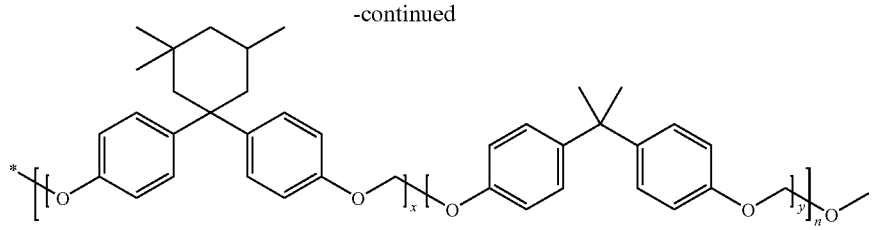

5.432 kg (17.5 mol) bisphenol TMC (x=70 mol %), 1.712 kg (7.5 mol) bisphenol A (y=30 mol %), 2.5 kg (62.5 mol) sodium hydroxide pellets and 56.33 g (0.375 mol) finely ground p-tert. butyl phenol (Aldrich) in 500 ml methylene chloride are added to a solvent mixture of 28.7 kg methylene chloride and 40.18 kg N-methyl-2-pyrrolidone (NMP) whilst stirring in nitrogen protective gas. After homogenising, the mixture is refluxed (78° C.) and stirred at this temperature for one hour. After cooling to 25° C. the reaction charge is diluted with 35 l methylene chloride and 20 l demineralised water. The charge is washed with water in a separator until neutral and salt-free (conductivity <15 µS·cm$^{-1}$). The organic phase from the separator is separated off and the solvent exchange of methylene chloride for chlorobenzene is carried out in an evaporation tank. The material is then extruded in a ZSK 32 evaporation extruder at a temperature of 280° C. and then granulated. After disposing of first runnings a total of 5.14 kg copolyformal is obtained as a transparent granulate. This still contains lower molecular cycles as an impurity. The material is left to swell overnight with ca 5 l acetone. The composition obtained is kneaded with several portions of fresh acetone until no further cycles maybe detected. The cleared material is dissolved in chlorobenzene and extruded again at 270° C. in the evaporation extruder. After disposing of first runnings, 3.11 kg polyformal is obtained as a transparent granulate.

Analysis:
Molecular weight Mw=39901, Mn=19538, D=2.04 by GPC (calibration against polycarbonate).
Glass transition temperature Tg=148.2° C.
Relative solution viscosity in methylene chloride (0.5 g/100 ml solution)=1.244/1.244 (granulate)
$^1$H-NMR in CDCl$_3$ shows the expected incorporation ratio=0.7/0.3 of the monomers TMC/BPA (integral of the chemical shifts of cyclic aliphatic groups (TMC) to methyl groups (BPA))

Example 4

Synthesis of the Copolyformal from Bisphenol TMC and 4,4'-dihydroxybiphenyl (DOD)

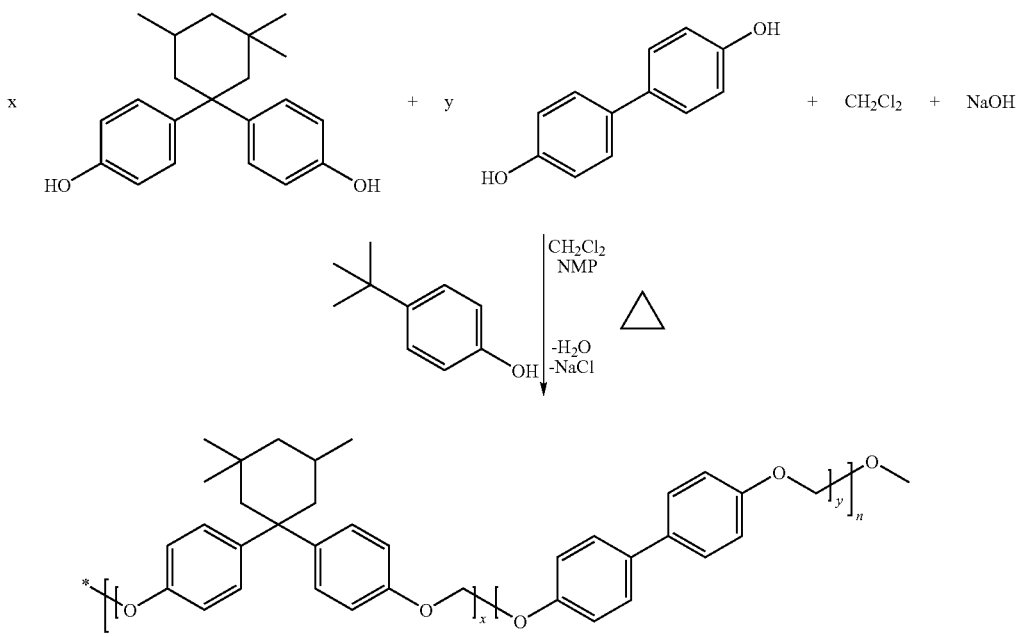

3.749 kg (12.07 mol) bisphenol TMC (x=90 mol %), 0.2497 kg (1.34 mol) 4,4'-dihydroxybiphenyl (DOD) (y=10 mol %), 1.339 kg (33.48 mol) sodium hydroxide pellets and 20.12 g (0.134 mol) finely ground p-tert. butyl phenol (Aldrich) in 200 ml methylene chloride are added to a solvent mixture of 12.01 methylene chloride and 22.25 kg N-methyl-2-pyrrolidone (NMP) whilst stirring in nitrogen protective gas. After homogenising the mixture is refluxed (78° C.) and stirred at this temperature for one hour. After cooling to 25° C., the reaction charge is diluted with 35 l methylene chloride and 20 l of demineralised water. The charge is washed with water in a separator until neutral and salt-free (conductivity <15 μS·cm$^{-1}$). The organic phase from the separator is separated off and the solvent exchange of methylene chloride for chorobenzene is carried out in an evaporation tank. The material is then extruded in a ZSK 32 evaporation extruder at a temperature of 280° C. and then granulated. After disposing of first runnings a total of 2.62 kg copolyformal is obtained as a transparent granulate. This still contains lower molecular cycles as an impurity. The material is left to swell overnight with ca 5 l acetone. The composition obtained is kneaded with several portions of fresh acetone until no further cycles maybe detected. The cleaned material is dissolved in chlorobenzene and extruded again at 240° C. in the evaporation extruder. After disposing of first runnings, polyformal is obtained as a transparent granulate.

Analysis:

Molecular weight Mw=44287, Mn=17877, D=2.48 by GPC (calibration against polycarbonate).

Glass transition temperature Tg=167° C.

Example 5

Synthesis of the Copolyformal from Bisphenol A and 4,4'-dihydroxybiphenyl (DOD)

ing the product with water and methanol and drying at 80° C. the polyformal is obtained as white polymer threads.

Analysis:

Molecular weight Mw=19057, Mn=4839, D=3.94 by GPC (calibration against polycarbonate).

Example 6

Hydrolysis Test of the BPA Polyformal from Example 2

The hydrolysis test is carried out by loading with the following hydrolysis media/temperature conditions and time-dependent determination of the molecular weight change by measuring the relative solution viscosity in methylene chloride (0.5 g/100 ml solution):

Hydrolysis medium: 0.1 N HCl/80° C.

0.1 N NaOH/80° C.

dist. Water/ ca. 100° C.

The results are as follows up to a total load time of 21 days (multiple measurements in each case):

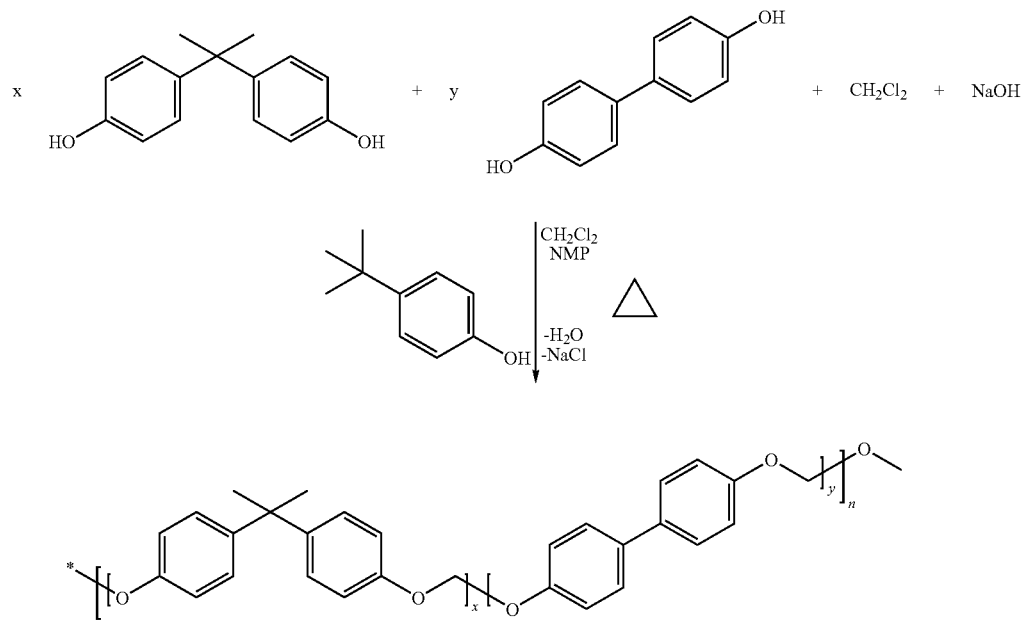

22.37 g (0.0098 mol) bisphenol A (x=70 mol %), 7.82 g (0.0042 mol) 4,4'-dihydroxybiphenyl (DOD) (y=30 mol %), 14.0 g (0.35 mol) sodium hydroxide pellets and 0.21 g (0.0014 mol) finely ground p-tert. butyl phenol (Aldrich) are added to a solvent mixture of 125 ml methylene chloride and 225 ml N-methyl-2-pyrrolidone (NMP) whilst stirring in nitrogen protective gas. After homogenising, the mixture is refluxed (78° C.) and stirred at this temperature for one hour. After cooling to 25° C., the reaction charge is diluted with methylene chloride and demineralised water. It is then washed with water until neutral and salt-free (conductivity <15 μS·cm$^{-1}$). The organic phase is separated off. The polymer is isolated by precipitating out in methanol. After washa) Hydrolysis medium: 0.1 N HCl/80° C.

| Time [days] | Relative solution viscosity η$_{rel}$ |
|---|---|
| 0 | 1.237/1.239 (zero sample) |
| 7 | 1.237/1.238/1.236/1.237/1.237/1.238 |
| 14 | 1.237/1.237/1.236/1.237/1.237/1.237 |
| 21 | 1.236/1.239/1.235/1.236/1.235/1.235 | a) Hydrolysis medium: 0.1 N NaOH/80° C.

| Time [days] | Relative solution viscosity $\eta_{rel}$ |
|---|---|
| 0 | 1.237/1.239 (zero sample) |
| 7 | 1.237/1.238/1.237/1.237/1.236/1.237 |
| 14 | 1.237/1.237/1.236/1.236/1.236/1.236 |
| 21 | 1.236/1.236/1.236/1.236/1.236/1.235 | a) Hydrolysis medium: distilled water/ca. 100° C.

| Time [days] | Relative solution viscosity $\eta_{rel}$ |
|---|---|
| 0 | 1.237/1.239 (zero sample) |
| 7 | 1.238/1.237/1.238/1.237/1.237/1.237 |
| 14 | Not measured |
| 21 | 1.238/1.237/1.237/1.237/1.237/1.235 |

Example 7

Hydrolysis Test of the TMC/BPA Copolyformal (70/30) from Example 3

The hydrolysis test is carried out by loading with the following hydrolysis media/temperature conditions and by time-dependent determination of the molecular weight change by measuring the relative solution viscosity in methylene chloride (0.5 g/100 ml solution):

Hydrolysis medium: 0.1 N HCl/80° C.
0.1 N NaOH/80° C.
dist. Water/ca. 100° C.

The results were as follows up to a total load time of 21 days (multiple measurements in each case):

a) hydrolysis medium: 0.1 N HCl/80° C.

| Time [days] | Relative solution viscosity $\eta_{rel}$ |
|---|---|
| 0 | 1.242/1.242 (zero sample; after injection molding to an 80 × 10 × 4 bar) |
| 7 | 1.242/1.242/1.243/1.243/1.242/1.243 |
| 14 | 1.240/1.241/1.240/1.242/1.241/1.241 |
| 21 | 1.243/1.243/1.243/1.242/1.243/1.243 | a) Hydrolysis medium: 0.1 N NaOH/80° C.

| Time [days] | Relative solution viscosity $\eta_{rel}$ |
|---|---|
| 0 | 1.242/1.242 (zero sample) |
| 7 | 1.243/1.242/1.243/1.243/1.243/1.243 |
| 14 | 1.240/1.241/1.241/1.241/1.242/1.242 |
| 21 | 1.242/1.242/1.243/1.242/1.243/1.242 | a) Hydrolysis medium: distilled water/ca. 100° C.

| Time [days] | Relative solution viscosity $\eta_{rel}$ |
|---|---|
| 0 | 1.242/1.242 (zero sample) |
| 7 | 1.242/1.243/1.242/1.243/1.243/1.242 |
| 14 | 1.241/1.241/1.241/1.242/1.241/1.241 |
| 21 | 1.242/1.243/1.242/1.241/1.244/1.243 |

Example 8

Hydrolysis Test of a TMC Polyformal (Analogue from Example 1, but with Greater Molecular Weight;)

Molecular weight Mw=50311, Mn=21637, D=2.32 by GPC (calibration against polycarbonate)

Glass transition temperature Tg=172° C.

Relative solution viscosity in methylene chloride (0.5 g/100 ml solution)=1.288/1.290

The hydrolysis test is carried out by loading with the following hydrolysis media/temperature conditions and by time-dependent determination of the molecular weight change by measuring the relative solution viscosity in methylene chloride (0.5 g/100 ml solution):

Hydrolysis medium: 0.1 N HCl/80° C.
0.1 N NaOH/80° C.
dist. Water/ca. 100° C.

The results are as follows up to a total load time of 21 days (multiple measurements in each case):

a) hydrolysis medium: 0.1 N HCl/80° C.

| Time [days] | Relative solution viscosity $\eta_{rel}$ |
|---|---|
| 0 | 1.288/1.290 (zero sample; after injection molding to 80 × 10 × 4 bar) |
| 7 | 1.291/1.290/1.289/1.288/1.288/1.290 |
| 14 | 1.288/1.288/1.289/1.289/1.288/1.288 |
| 21 | 1.288/1.288/1.289/1.289/1.289/1.289 | a) hydrolysis medium: 0.1 N NaOH/80° C.

| Time [days] | Relative solution viscosity $\eta_{rel}$ |
|---|---|
| 0 | 1.288/1.290 (zero sample) |
| 7 | 1.289/1.289/1.290/1.290/1.289/1.289 |
| 14 | 1.287/1.289/1.288/1.289/1.286/1.287 |
| 21 | 1.287/1.288/1.294/1.294/1.288/1.288 | a) hydrolysis medium: distilled water/ca. 100° C.

| Time [days] | Relative solution viscosity $\eta_{rel}$ |
|---|---|
| 0 | 1.288/1.290 (zero sample) |
| 7 | 1.285 |
| 14 | 1.281 |
| 21 | 1.284 |

Example 9

Hydrolysis Test of the Polycarbonate Makrolon® 2808, Bayer AG (Reference Experiment)

The hydrolysis test is carried out by loading with the following hydrolysis media/temperature conditions and by time-dependent determination of the molecular weight change by measuring the relative solution viscosity in methylene chloride (0.5 g/100 ml solution):

Hydrolysis medium: 0.1 N HCl/80° C.
0.1 N NaOH/80° C.
dist. Water/ca. 100° C.

The results are as follows up to a total load time of 21 days (multiple measurements in each case):

a) hydrolysis medium: 0.1 N HCl/80° C.

| Time [days] | Relative solution viscosity $\eta_{rel}$ |
|---|---|
| 0 | 1.284/1.289 (zero sample; after injection molding to 80 × 10 × 4 bar) |
| 7 | 1.282/1.280/1.281/1.283/1.278/1.280 |
| 14 | 1.280/1.281/1.278/1.279/1.280/1.280 |
| 21 | 1.275/1.276/1.276/1.276/1.277/1.277 | a) hydrolysis medium: 0.1 N NaOH/80° C.

| Time [days] | Relative solution viscosity $\eta_{rel}$ |
|---|---|
| 0 | 1.284/1.289 (zero sample) |
| 7 | 1.279/1.280/1.279/1.279/1.280/1.280 |
| 14 | 1.277/1.277/1.277/1.277/1.279/1.279 |
| 21 | 1.277/1.277/1.274/1.274/1.279/1.282 | a) hydrolysis medium: distilled water/ca. 100° C.

| Time [days] | Relative solution viscosity $\eta_{rel}$ |
|---|---|
| 0 | 1.284/1.289 (zero sample) |
| 7 | 1.272 |
| 14 | 1.273 |
| 21 | 1.273 |

It is clear that the solution viscosity of polycarbonate is reduced further after hydrolysis loading than is the case with polyformals. This means that polycarbonate maybe degraded more easily and is thus less stable than polyformal. A coextrusion layer of polyformal thus acts as a protective layer against premature damage of the sheet.

Example 10

Synthesis of the Copolyformal from Bisphenol TMC and Resorcinol:

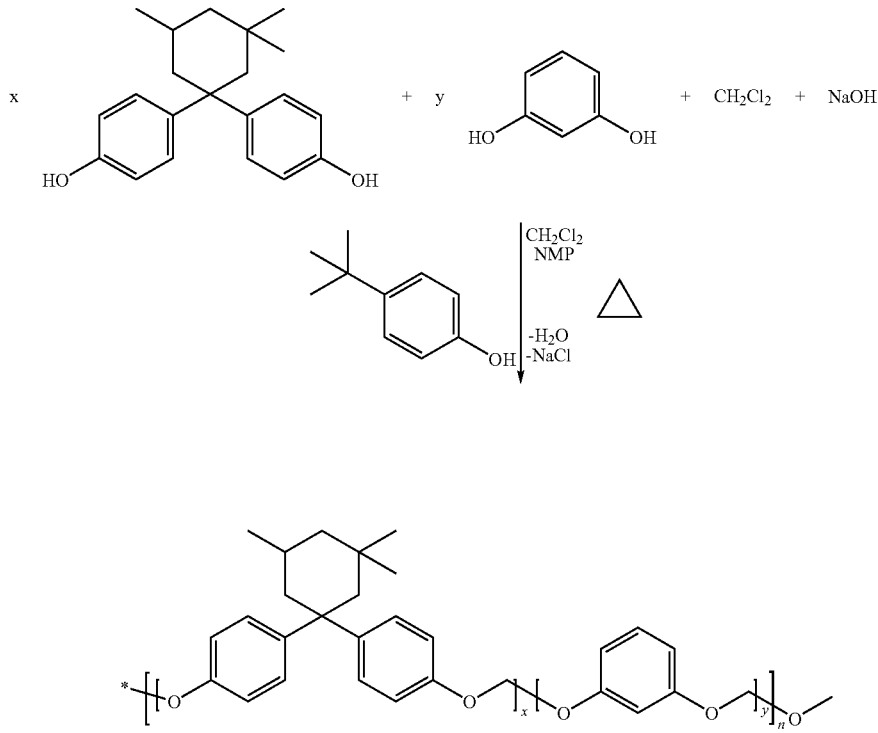

39.1 g (0.126 mol) bisphenol TMC (x=90 mol %), 1.542 g (0.014 mol) resorcinol (y=10 mol %), 14.0 g (0.35 mol) sodium hydroxide pellets and 0.21 g (0.0014 mol) finely ground p-tert. butyl phenol (Aldrich) are added to a solvent mixture of 125 ml methylene chloride and 225 ml N-methyl-2-pyrrolidone (NMP) whilst stirring in nitrogen protective gas. After homogenising the mixture is refluxed (78° C.) and stirred at this temperature for one hour. After cooling to 25° C., the reaction charge is diluted with methylene chloride and demineralised water. It is then washed with water until neutral and salt-free (conductivity <15 μS·cm$^{-1}$). The organic phase is separated off. The polymer is isolated by precipitating out in methanol. After washing the product with water and methanol, separating off the cycles with acetone and drying at 80° C. the polyformal is obtained as white polymer threads.

Analysis:

Molecular weight Mw=32008, Mn=12251, D=2.6 by GPC (calibration against polycarbonate).

Glass transition temperature Tg=163° C.

Example 11

Synthesis of the Copolyformal from Bisphenol TMC and m-p-bisphenol A 14.84 g (0.065 mol) bisphenol TMC (x=50 mol %), 20.18 g (0.065 mol) m,p-bisphenol A (3,4-isopropylidene diphenol) (y=50 mol %), 14.0 g (0.35 mol) sodium hydroxide pellets and 0.21 g (0.0014 mol) finely ground p-tert. butyl phenol (Aldrich) are added to a solvent mixture of 125 ml methylene chloride and 225 ml N-methyl-2-pyrrolidone (NMP) whilst stirring in nitrogen protective gas. After homogenising the mixture is refluxed (78° C.) and stirred at this temperature for one hour. After cooling to 25° C., the reaction charge is diluted with methylene chloride and demineralised water. It is then washed with water until neutral and salt-free (conductivity <15 μS·cm$^{-1}$). The organic phase is separated off. The polymer is isolated by precipitating out in methanol. After washing the product with water and methanol, separating off the cycles with acetone and drying at 80° C. the polyformal is obtained as white polymer threads.

Analysis:

Molecular weight Mw=28254, Mn=16312, D=1.73 by GPC (calibration against polycarbonate).

Glass transition temperature Tg=92° C.

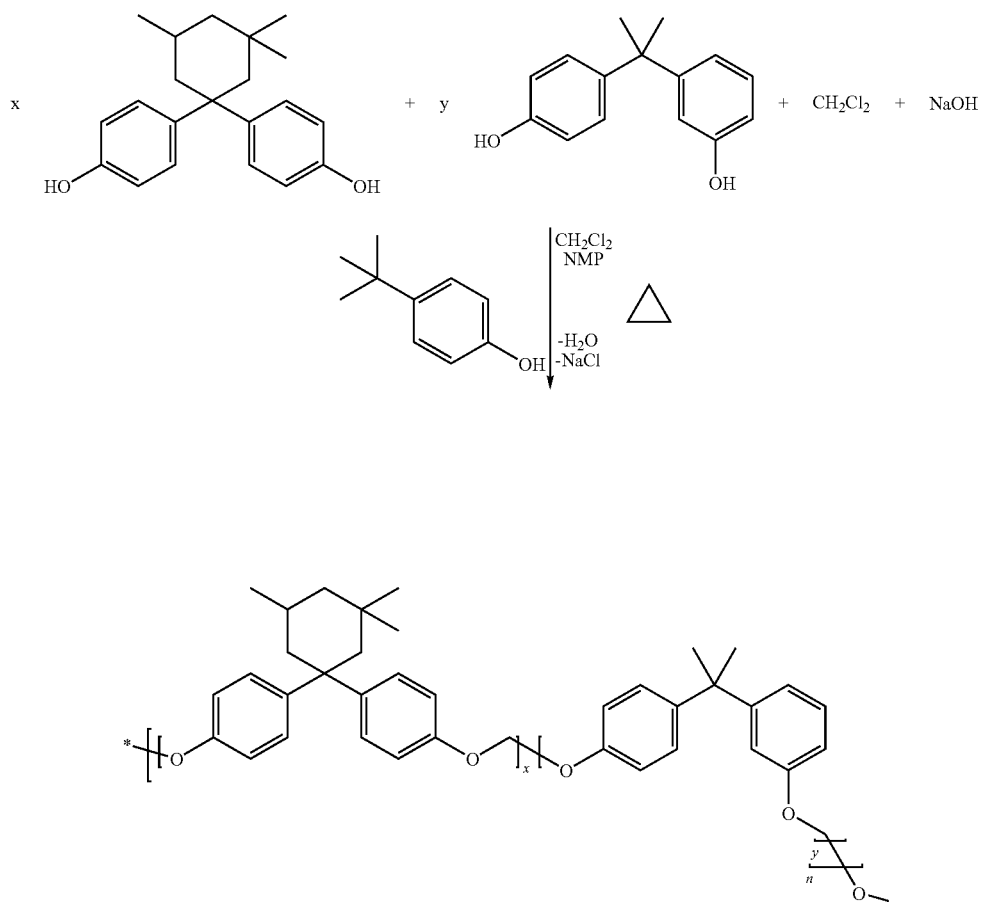

Example 12

Synthesis of the Copolyformal from Bisphenol A and 4,4'-sulfone diphenol

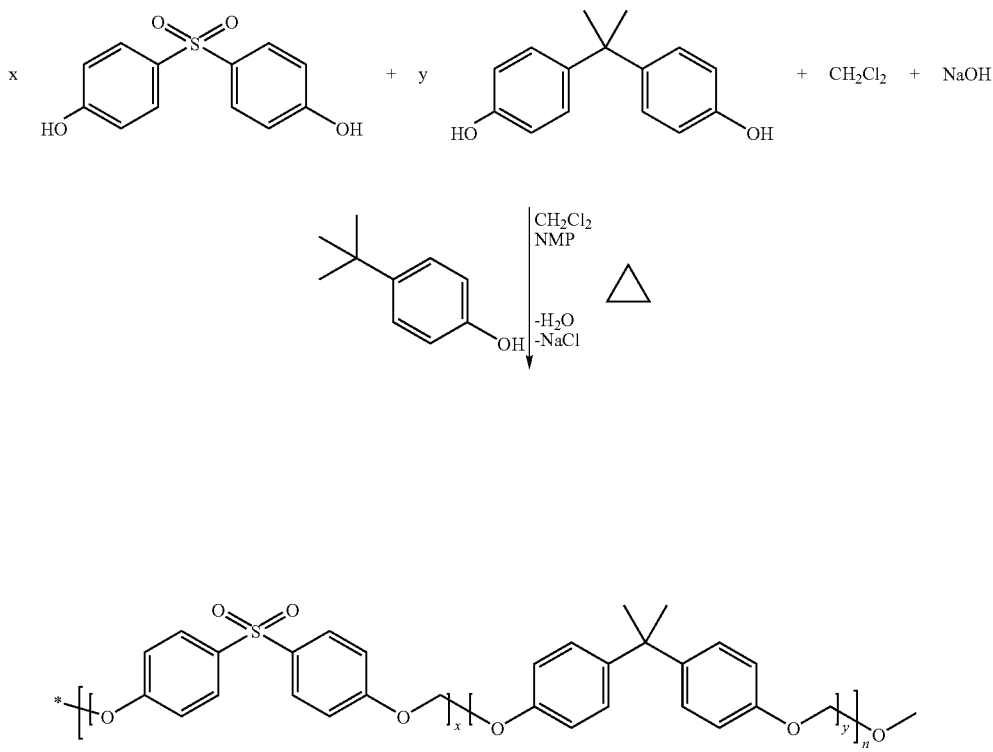

36.29 g (0.145 mol) 4,4'-sulfone diphenol (x=50 mol %), 33.46 g (0.145 mol) bisphenol A (y=50 mol %), 28.8 g (0.72 mol) sodium hydroxide pellets and 0.436 g (0.0029 mol) finely ground p-tert. butyl phenol (Aldrich) are added to a solvent mixture of 300 ml methylene chloride and 570 ml N-methyl-2-pyrrolidone (NMP) whilst stirring in nitrogen protective gas. After homogenising, the mixture is refluxed (78° C.) and stirred at this temperature for one hour. After cooling to 25° C., the reaction charge is diluted with methylene chloride and demineralised water. It is then washed with water until neutral and salt-free (conductivity <15 µS·cm$^{-1}$). The organic phase is separated off. The polymer is isolated by precipitating out in methanol. After washing the product with water and methanol, separating off the cycles with acetone and drying at 80° C. the polyformal is obtained as white polymer threads.

Analysis:

Molecular weight Mw=21546, Mn=7786, D=2.76 by GPC (calibration against polycarbonate).

Glass transition temperature Tg=131° C.

Example 13

Synthesis of the Polyformal from 4,4'-dihydroxyphenyl Ether

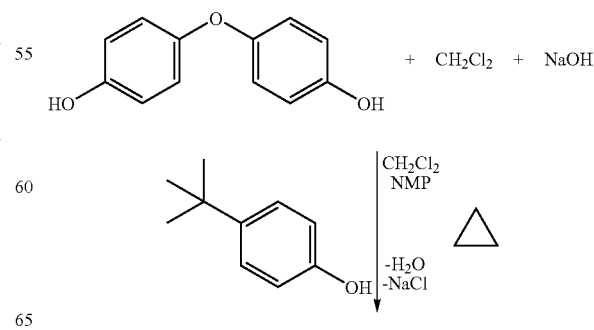

-continued

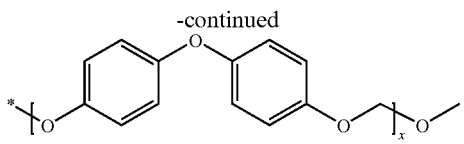

28.30 g (0.14 mol) 4,4'-dihydroxyphenyl ether (Bayer AG), 14.0 g (0.35 mol) sodium hydroxide pellets and 0.21 g (0.0014 mol) finely-ground p-tert. butyl phenol (Aldrich) are added to a solvent mixture of 125 ml methylene chloride and 225 ml N-methyl-2-pyrrolidone (NMP) whilst stirring in nitrogen protective gas. After homogenising, the mixture is refluxed (78° C.) and stirred at this temperature for one hour. After cooling to 25° C., the reaction charge is diluted with methylene chloride and demineralised water. It is then washed with water until neutral and salt-free (conductivity <15 μS·cm$^{-1}$). The organic phase is separated off. The polymer is isolated by precipitating out in methanol. After washing the product with water and methanol, separating off the cycles with acetone and drying at 80° C., the polyformal is obtained as white polymer threads.

Analysis:

Molecular weight Mw=24034, Mn=9769, D=2.46 by GPC (calibration against polycarbonate).

Glass transition temperature Tg=57° C.

Example 14

Solid Sheets 3 mm thick coextruded solid sheets A to D were obtained from the following compositions (molding compositions):

Makrolon® 3103 (linear bisphenol A homopolycarbonate from Bayer AG, Leverkusen, Germany with a melt flow rate (MFR) of 6.5 g/10 min at 300° C. and 1.2 kg load (measured to ISO 1133)) was used as a base material for sheets A to D. Makrolon® 3103 contains UV absorbers.

The polyformals A to D with the compositions given in the table, based on TMC polyformal or BPA polyformal with a solution viscosity of 1.234 and 1.237, were used as a coextrusion layer.

The coextrusion layer was approximately 50 μm thick in each case.

The following table summarises the composition of the sheets:

| Sheet | Coextrusion layer |
|-------|-------------------|
| A | TMC polyformal containing 5 wt. % Tinuvin 360*) |
| B | TMC polyformal |
| C | BPA polyformal containing 5 wt. % Tinuvin 360 |
| D | BPA polyformal |

*)Tinuvin ® 360 is 2,2'-methylene-bis[4-(1,1,3,3-tetramethylbutyl)-6-benzotriazolyl phenol] and is obtainable commercially as Tinuvin ® 360 from Ciba Spezialitätenchemie, Lampertheim, Germany.

Example 15

7% by weight of Tinuvin 360 are added to the polyformal of Example 2. A (cast) sheet having a thickness of 50 micrometers is produced from this mixture. A sheet of Makrolon 3108 containing 7% by weight of Tunuvin 360 is also produced analogously (comparative sample 1).

These sheets are applied as protective layers by welding to polycarbonate sheets of Makrolon 2600 having a thickness of 4 mm. A polycarbonate sheet of Makrolon 2600 without any additional protective layer is used as an additional comparative sample 2.

The polyformal samples containing UV absorbers and the comparative samples 1 and 2 are subjected to weathering in Xenon WOM (from Atlas) under the following conditions:

Weathering with sprinkling: cycle 102:18
Intensity of irradiation: 1400 W/m2 (at 300-80 nm)
3.3 W/m2 (at 420 nm)
0.9 W/m2 (at 340 nm)
Black panel temperature: 85° C.
Interior temperature: 67° C.

The following results are obtained after weathering for 2000 hours:

| Sample | T [%], 0 hours | T [%], 2000 hours | YI 0 hours | YI 2000 hours | Cl [%] 0 hours | Cl [%] 2000 hours |
|--------|----------------|-------------------|-----------|---------------|----------------|-------------------|
| Polyformal containing a UV absorber | 87 | 86.5 86.5 | 7 | 7 7 | 3 | 12 12 |
| Polycarbonat containing no UV absorber | 87.5 | 54 64 | 7 | 33.5 34.5 | 1 | 69 80 |
| Polycarbonat containing a UV absorber | 87 | 86 86.5 | 7 | 7.5 9.5 | 3 | 19.5 20 |

T = transmission
YI = yellowness index
Cl = clouding

Microscopic examination also reveals very pronounced crack formation in the blank samples. By comparison, no cracks are observed in the polyformal sample.

The machinery and apparatus used for the production of the multi-layer solid sheets are described below:

The device consisted of:
- the main extruder with a screw length of 33 D and a diameter of 60 mm with degassing
- the coexadapter (feedblock system)
- a coextruder to apply the top layer with a screw length of 25 D and a diameter of 30 mm
- the special flat sheet die 350 mm wide
- the polishing roller
- the roller train
- the take-off device
- the cutting device (saw)
- the receiving table The polycarbonate of the base material was added to the filling hopper of the main extruder, the coextrusion material to that of the coextruder. Melting and feeding of each material took place in the respective plasticizing system (cylinder/screw). Both material melts were combined in the coex adapter and, after leaving the nozzle and cooling in the calendar, formed a composite structure.

The other devices served to transport, cut to length and receive the co-extruded sheets.

The sheets obtained were then inspected visually. Transparent sheets suitable for the uses described are obtained.

Although the invention has been described in detail in the foregoing for the purpose of illustration, it is to be understood that such detail is solely for that purpose and that variations maybe made therein by those skilled in the art without departing from the spirit and scope of the invention except as it may be limited by the claims.

What is claimed is:

1. A coextruded multi-layer article comprising a base layer that contains at least one thermoplastic resin and a coextruded protective coating layer consisting of
a thermoplastic (co)polyformal of formulae (2a), (2b), (2c) and/or (2d):

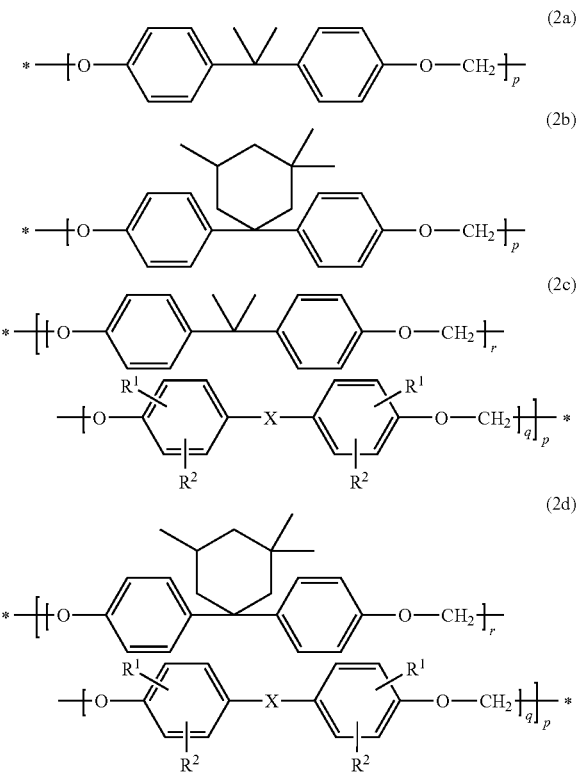

wherein
$R^1$ and $R^2$
are, independently of one another, H, a linear or branched $C_1$-$C_{18}$ alkyl- or alkoxy group, halogen or an optionally substituted aryl or aralkyl group;
X is a single bond, a $C_1$-$C_6$ alkylene group, a $C_2$-$C_5$ alkylidene, a $C_5$-$C_6$ cycloalkylidene group, optionally substituted with $C_1$-$C_6$ alkyl, or a $C_6$-$C_{12}$ arylene group, wherein said $C_6$-$C_{12}$ arylene group is optionally condensed with further aromatic rings containing heteroatoms;
p is an integer from 1 to 1500;
q is a fractional number z/p;
r is a fractional number (p-z)/p;
z is an integer from 0 to p,
and wherein said thermoplastic polyformal of formulae (2a) and/or (2b) and / or a copolyformal of formula (2c) and/or (2d) optionally contains from 0.05 to 2 mol % of branching agents; and wherein said thermoplastic polyformal of formulae (2a) and/or (2b) and/or a copolyformal of formula (2c) and/or (2d) is chain stopped with phenols; or a blend of said thermoplastic (co)polyformals with (co)polycarbonate and/or (co)polyesters,
and optionally one or more additives selected from the group consisting of UV absorbers, stabilizers, mold release agents, esters or partial esters of mono- to hexavalent alcohols, organic dyes, inorganic colour pigments, fluorescent, dyes optical brighteners and antistatics.

2. The coextruded multi-layer article of claim 1, wherein said at least one thermoplastic resin is selected from the group consisting of polycarbonate, copolycarbonate, polyester, copolyester, polyestercarbonate, polymethyl methacrylate, and mixtures thereof.

3. The coextruded multi-layer article of claim 1, wherein said at least one thermoplastic resin is selected from the group consisting of homopolycarbonate based on bisphenol A, homopolycarbonate based on 1,1-bis-(4-hydroxyphenyl)-3,3,5-trimethyl cyclohexane, copolycarbonates based on bisphenol A and 1,1-bis-(4-hydroxyphenyl)-3,3,5-trimethyl cyclohexane, and copolycarbonates based on bisphenol A and 4,4'-dihydroxy diphenyl.

4. The coextruded multi-layer article of claim 1, wherein said coextruded protective coating layer is from 10 to 500 μm thick.

5. The coextruded multi-layer article of claim 1, wherein said coextruded multi-layer article is a coextruded multi-layer container.

6. The coextruded multi-layer article of claim 5, wherein said coextruded multi-layer container is prepared by blow molding.

7. The coextruded multi-layer article of claim 5, wherein said at least one thermoplastic resin is selected from the group consisting of polycarbonate, copolycarbonate, polyester, copolyester, polyestercarbonate, polymethyl methacrylate, and mixtures thereof.

8. The coextruded multi-layer article of claim 5, wherein said at least one thermoplastic resin is selected from the group consisting of homopolycarbonate based on bisphenol A, homopolycarbonate based on 1,1-bis-(4-hydroxyphenyl)-3,3,5-trimethyl cyclohexane, copolycarbonates based on bisphenol A and 1,1 -bis-(4-hydroxyphenyl)-3,3,5-trimethyl cyclohexane, and copolycarbonates based on bisphenol A and 4,4'-dihydroxy diphenyl.

9. The coextruded multi-layer article of claim 5, wherein said coextruded protective coating layer is from 10 to 500 μm thick.

10. The coextruded multi-layer article of claim 5, wherein said coextruded protective coating layer is an inside layer.

11. The coextruded multi-layer article of claim 1, wherein said UV absorber is present in an amount in the range of from 1 to 20 weight %, wherein the percentage by weight of said UV absorber is relative to the total weight of said coextruded protective coating layer.

12. The coextruded multi-layer article of claim 11, wherein said coextruded multi-layer article is a coextruded multi-layer container.

13. The coextruded multi-layer article of claim 1, wherein said halogen is Cl or Br and said $C_1$-$C_6$ alkylene group is methyl or ethyl.

* * * * *